United States Patent
Yamamura

(10) Patent No.: US 10,419,519 B2
(45) Date of Patent: Sep. 17, 2019

(54) APPARATUS AND METHOD FOR TRANSFERRING DATA VIA HETEROGENEOUS NETWORKS

(71) Applicant: FUJITSU LIMITED, Kawasaki-shi, Kanagawa (JP)

(72) Inventor: Shinya Yamamura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 1483 days.

(21) Appl. No.: 13/925,002

(22) Filed: Jun. 24, 2013

(65) Prior Publication Data
US 2014/0059157 A1 Feb. 27, 2014

(30) Foreign Application Priority Data
Aug. 24, 2012 (JP) .................. 2012-185812

(51) Int. Cl.
*H04L 29/08* (2006.01)
*H04W 84/00* (2009.01)

(52) U.S. Cl.
CPC ........... *H04L 67/06* (2013.01); *H04W 84/005* (2013.01)

(58) Field of Classification Search
CPC ................. H04W 36/14; H04L 45/125; H04L 2012/5618; H04L 2012/6443
See application file for complete search history.

(56) References Cited

U.S. PATENT DOCUMENTS

| | | | | |
|---|---|---|---|---|
| 5,519,699 A | * | 5/1996 | Ohsawa | H04L 29/06 370/224 |
| 7,948,966 B2 | * | 5/2011 | Hughes | H04L 45/125 370/351 |
| 9,036,509 B1 | * | 5/2015 | Addepalli | H04W 4/046 370/259 |
| 2005/0063303 A1 | * | 3/2005 | Samuels | H04L 69/16 370/229 |

(Continued)

FOREIGN PATENT DOCUMENTS

| | | | |
|---|---|---|---|
| CN | 102882778 A | * | 1/2013 |
| JP | 2002-290563 | | 10/2002 |

(Continued)

OTHER PUBLICATIONS

Thrasyvoulos Spyropoulos, Thierry Turletti, and Katia Obraczka. "Routing in Delay-Tolerant Networks Comprising Heterogeneous Node Populations". IEEE Transactions on Mobile Computing, vol. 8, No. 8: Aug. 2009. pp. 1132-1147.*

(Continued)

*Primary Examiner* — Arvin Eskandarnia
(74) *Attorney, Agent, or Firm* — Staas & Halsey LLP

(57) ABSTRACT

A relay device communicates with first and second terminal devices via first and second communication networks, respectively. The relay device determines whether or not a line stability and a line speed of each of the first and second communication networks satisfy a predetermined condition. When a line stability and a line speed of each of the first and second communication networks satisfy the predetermined (Continued)

condition, the relay device temporarily stores, in a memory, data received from the first terminal device via the first communication network, and transfers the temporarily stored data to the second terminal device via the second communication network.

10 Claims, 20 Drawing Sheets

(56) References Cited

U.S. PATENT DOCUMENTS

| | | | |
|---|---|---|---|
| 2005/0114711 A1* | 5/2005 | Hesselink | H04L 63/0209 726/4 |
| 2005/0144186 A1* | 6/2005 | Hesselink | H04L 67/06 |
| 2005/0181792 A1 | 8/2005 | Kobayashi et al. | |
| 2006/0040705 A1* | 2/2006 | Kawakami | H04L 45/122 455/561 |
| 2007/0008927 A1* | 1/2007 | Herz | H04L 45/00 370/331 |
| 2009/0116393 A1* | 5/2009 | Hughes | H04L 45/124 370/238 |
| 2009/0213850 A1* | 8/2009 | Viger | H04L 47/10 370/389 |
| 2010/0121957 A1* | 5/2010 | Roy | H04L 63/1466 709/227 |
| 2012/0057456 A1* | 3/2012 | Bogatin | H04W 28/08 370/230.1 |
| 2012/0100808 A1 | 4/2012 | Suzuki | |
| 2013/0336206 A1* | 12/2013 | Farhadi | H04W 4/005 370/328 |

FOREIGN PATENT DOCUMENTS

| | | | | |
|---|---|---|---|---|
| JP | 2004-153802 | | 5/2004 | |
| JP | 2006-80782 | | 3/2006 | |
| JP | 2006245824 A | * | 9/2006 | |
| JP | 2011-4258 | | 1/2011 | |
| WO | WO 2010121205 A9 | * | 5/2011 | H04W 28/08 |

OTHER PUBLICATIONS

Sunil Suresh Kulkarni and Catherine Rosenberg. "Opportunistic Scheduling for Wireless Systems with Multiple Interfaces and Multiple Constraints". MSWiM '03: Sep. 19, 2003. ACM. pp. 11-19.*
Sungsoon Cho and John P. Hayes. "Impact of Mobility on Connection Stability in Ad Hoc Networks". IEEE Communications Society: WCNC 2005. Mar. 13-17, 2005. pp. 1650-1656 (vol. 3).*
Machine translation of Description section of CN 102882778. 11 pages. Translated Jun. 15, 2016.*
Azarias Reda, Brian Noble. "A Hybrid Overlay Network for Bulk Data in Challenged Networks." CSR-TR-565-10. Oct. 21, 2010. 11 pages. Archived May 24, 2011. Available online: https://web.archive.org/web/20110524170851/http://www.eecs.umich.edu/techreports/cse/2010/CSR-TR-565-10.pdf.*
Evan P.C. Jones, Lily Li, Jakub K. Schmidtke, and Paul A.S. Ward. "Practical Routing in Delay-Tolerant Networks" in vol. 8, No. 6 of IEEE Transactions on Computing. Aug. 2007. pp. 943-959.*
Cisco. "Cut-Through and Store-and-Forward Ethernet Switching for Low-Latency Environments". Dated 2008 (month unknown). 13 pages.*
J. Border, J. Griner, and Z. Shelby. "Performance Enhancing Proxies Intended to Mitigate Link-Related Degradations." RFC 3135. The Internet Society. Jun. 2001. 45 pages.*
Mark Williams Company. "COHERENT: A Multi-User, Multi-Tasking Operating System for IBM PC Compatibles." MWC, Northbrook, IL: 1994. "P" section, pp. 971-1022, plus front matter.*
John Roese. "Switched LANs." McGraw-Hill, New York, NY: 1998. pp. 28-31, plus front matter.*
Lalit Kumar, Khem Kumar Nagar, and Deepak Garg. "Optimizing Routing in Delay-Tolerant Network (DTNS)." Presented at "Emerging Trends in Electrical, Instrumentation & Communication Engineering (ETEIC-2012)", organized by Departments of EI, EC & EE, Anand Engineering College: Keetham, Agra, India. Apr. 6 & 7, 2012. Also published: IJECSE in vol. 1, No. 3, May-Aug. 2012. pp. 845-852.*
Machine translation of JP 2006-245824.*
Kevin Fall, "A Delay-Tolerant Network Architecture for Challenged Internets", Feb. 2003, pp. 1-14.
Shinya Yamamura et al., "Virtual Segment: Store-Carry-Forward-Relay Based Support for Wide-Area Non-Real-Time Data Exchange", Jul. 2010, pp. 30-46.
Wenrui Zhao et al., "Capacity Enhancement using Throw-Boxes in Mobile Delay Tolerant Networks", 2006, pp. 1-20.
Wenrui Zhao et al., "Controlling the Mobility of Multiple Data Transport Ferries in a Delay-Tolerant Network", 2005, pp. 1-12.
Bret Hull et al., "CarTel: A Distribution Mobile Sensor Computing System", Nov. 2006, pp. 1-14.
Aruna Balasubramanian et al., "DTN Routing as a Resource Allocation Problem", Aug. 2007, pp. 1-12.
Michele Garetto et al, "Capacity Scaling in Delay Tolerant Networks with Heterogeneous Mobile Nodes", Sep. 2007, pp. 1-10.
Takahiro Matsuda et al., "(p,q)-Epidemic Routing for Sparsely Populated Mobile Ad Hoc Networks", Jan. 2008, pp. 783-793.
Anders Lindgren et al., "Probabilistic Routing in Intermittently Connected Networks", Aug. 2003, pp. 1-8.
Amin Vandet et al., "Epidemic Routing for Partially-Connected Ad Hoc Networks", 2000, pp. 1-14.
Robin Groenevelt et al., "The Message Delay in Mobile Ad Hoc Networks", Jul. 2005, pp. 1-21.
Zhensheng Zhang, "Routing in Intermittently Connected Mobile Ad Hoc Networks and Delay Tolerant Networks: Overview and Challenges", 2006, pp. 24-37.
Japanese Office Action dated Feb. 23, 2016 in related Japanese Application No. 2012-185812.

* cited by examiner

FIG. 5

| MESSAGE IDENTIFICATION (341A) | DESTINATION IDENTIFICATION (342A) | LIFE TIME (343A) | MESSAGE BODY (344A) |
|---|---|---|---|
| | ⋮ | | |
| | | | |

| IF IDENTIFICATION (341B) | LINE STABILITY (342B) | LINE SPEED (343B) |
|---|---|---|
| | ⋮ | |
| | | |

| DESTINATION IDENTIFICATION (351A) | CONNECTION STATUS (352A) |
|---|---|
| | ⋮ |
| | |

| IF IDENTIFICATION (341C) | CONTACT HISTORY (342C) | TERMINAL IDENTIFICATION (343C) | LINE STABILITY (344C) | LINE SPEED (345C) |
|---|---|---|---|---|
| ⋮ | | | ⋮ | |
| | | | | |

| | CR1 | CR2 | CRA1 | CRA2 | CSN |
|---|---|---|---|---|---|
| 91 ～ SOURCE IP ADDRESS | IP ADDRESS OF MACHINE | IP ADDRESS OF MOBILE ROUTER | IP ADDRESS OF SERVER | IP ADDRESS OF MOBILE ROUTER | IP ADDRESS OF MOBILE ROUTER |
| 92 ～ DESTINATION IP ADDRESS | BROADCAST | IP ADDRESS OF SERVER | IP ADDRESS OF MOBILE ROUTER | IP ADDRESS OF MACHINE | IP ADDRESS OF SERVER |
| 93 ～ SOURCE PORT NUMBER | ARBITRARY PORT NUMBER (MP1) | ARBITRARY PORT NUMBER (PP1) | ARBITRARY PORT NUMBER (SP1) | ARBITRARY PORT NUMBER (PP2) | ARBITRARY PORT NUMBER (PP1) |
| 94 ～ DESTINATION PORT NUMBER | PROXY PORT NUMBER | APPLICATION PORT NUMBER | ARBITRARY PORT NUMBER (PP1) | ARBITRARY PORT NUMBER (MP1) | APPLICATION PORT NUMBER |
| 95 ～ DATA | MESSAGE TYPE, MACHINE IDENTIFICATION, SERVER IDENTIFICATION, SERVER PORT NUMBER | MESSAGE TYPE, MACHINE IDENTIFICATION, SERVER IDENTIFICATION, SERVER PORT NUMBER | MESSAGE TYPE, MACHINE TYPE | MESSAGE TYPE, MACHINE IDENTIFICATION | MESSAGE TYPE, MACHINE IDENTIFICATION, CONNECTION STATUS |

APPARATUS AND METHOD FOR TRANSFERRING DATA VIA HETEROGENEOUS NETWORKS

CROSS-REFERENCE TO RELATED APPLICATION

This application is based upon and claims the benefit of priority of the prior Japanese Patent Application No. 2012-185812, filed on Aug. 24, 2012, the entire contents of which are incorporated herein by reference.

FIELD

The embodiments discussed herein are related to apparatus and method for transferring data via heterogeneous networks.

BACKGROUND

There are machine-to-machine (M2M) information collecting systems that transfer data between a machine and a machine that are able to communicate with each other. In some existing M2M information collecting systems, M2M service providers use dedicated wire lines for individual machines. However, laying dedicated wire lines leads to very high cost. Some M2M information collecting systems use mobile networks of cellular phones that have spread throughout the world. However, the communication speed of mobile networks is low, and moreover their communication cost is high.

Accordingly, there has been also proposed a scheme in which transfer of data between a machine and a machine is realized by wireless ad hoc communication, and data is aggregated at a gateway connected to a mobile network or a dedicated line. FIG. 22 is an explanatory diagram illustrating an example of an M2M information collecting system. An M2M information collecting system 200 illustrated as FIG. 22 includes a machine 201, a communication interface (hereinafter, simply referred to as IF) 202, an access network 203 such as a wireless ad hoc network, a gateway 204, a core network 205, and a server 206. The machine 201 uses the communication IF 202 to establish a connection with the server 206 via the access network 203, the gateway 204, and the core network 205. Then, after establishing a connection with the server 206, the machine 201 transmits data from the machine 201 to the server 206.

However, to build a wireless ad hoc network, the placement density of machines 201 has to be increased, leading to very high cost.

Accordingly, M2M information collecting systems exist which use a Delay Tolerant Networking (DTN)-based store-carry-forward communication scheme in areas where there is no communication infrastructure, without increasing the placement density of machines 201. FIG. 23 is an explanatory diagram illustrating an example of an M2M information collecting system. An M2M information collecting system 300 illustrated as FIG. 23 includes a machine 301, a communication IF 302, a first short-range wireless network 303, a relay device 304, a second short-range wireless network 305, a fixed access point (hereinafter, simply referred to as AP) 306, and an access network 307. Further, the M2M information collecting system 300 includes a gateway 308, a core network 309, and a server 310. In the M2M information collecting system 300, the relay device 304 based on the store-carry-forward communication scheme physically moves while being carried by a human being, a vehicle, or the like, in the area between the first short-range wireless network 303 and the second short-range wireless network 305 where no communication infrastructure exists.

The relay device 304 moves into the area of the first short-range wireless network 303, communicates with the machine IF 302 of the machine 301 located within the first short-range wireless network 303, and receives information from the machine 301. Further, the relay device 304 passes through the area between the first short-range wireless network 303 and the second short-range wireless network 305 where no communication infrastructure exists, and moves into the area of the second short-range wireless network 305. The relay device 304 moves into the area of the second short-range wireless network 305 and communicates with the second short-range wireless network 305. Further, the fixed AP 306 receives data on the machine 301 via the second short-range wireless network 305 from the relay device 304 that has moved into the area of the second short-range wireless network 305, and transmits the received data to the gateway 308 via the access network 307. Further, the gateway 308 transmits the data received via the access network 307 to the server 310 via the core network 309.

As a result, in the M2M information collecting system 300 illustrated as FIG. 23, the relay device 304 based on the DTN scheme complements the communication in the area between the first short-range wireless network 303 and the second short-range wireless network 305 where no communication infrastructure exists. Then, in the M2M information collecting system 300, data from the machine 301 is transferred to the server 310.

The followings are related arts:
Japanese Laid-open Patent Publication No. 2002-290563;
Japanese Laid-open Patent Publication No. 2006-80782;
K. Fall, "A Delay-Tolerant Network Architecture for Challenged Internets", in Proc. *ACM SIGCOMM*, pp. 27-34, 2003;
Z. Zhang, "Routing in intermittently connected mobile ad hoc networks and delay tolerant networks: overview and challenges", *IEEE Communications Surveys Tutorials* 8(1), pp. 24-37, 2006;
Vahdat, D. Becker, "Epidemic routing for partially connected ad hoc networks", *Technical Report* CS-2000-06, 2000;
R. Groenevelt, P. Nain and G. Koole, "The Message Delay in Mobile Ad Hoc Networks.,"*Performance Evaluation*, vol. 62, pp. 210-228, October 2005;
T. Matsuda, T. Takine, (p,q)-"Epidemic Routing for Sparsely Populated Mobile Ad Hock Networks., Selected Areas in Communications", *IEEE Journal*, vol. 28. pp. 783-793, 2008;
Lindgre, A. Doria and O. Schelen, "Probalistic Routing in Intermittently Connected Networks.", in *Proc. SAPIR Workshop*, pp. 239-254, August 2003;
Balasubramanian, B. Levine and A. Venkataramani, "DTN routing as Resource Allocation Problem.", in *Proc. ACM SIGCOMM*, pp. 373-384, August 2007;
M. Garetto, P. Giaccone, E. Leonardi, "Capacity scaling in delay tolerant networks with heterogeneous mobile nodes", in *Proc. ACM Mob/Hoc*, pp. 41-50, 2007;
W. Zhao, Y. Chen, M. Ammar, M. Corner, B. Levine, and E. Zegura, "Capacity Enhancement using throwboxes in mobile tolerant network", *SCS Technical report* GIT-CSS-06-04, 2006;
Hull, V. Bychkovskiy, K. Chen, M. Goraczko, E. Shih, Y. Zhang, H. Balakrishnan, S. Madden, CarTel: "a distributed mobile sensor computing system", in: *Proc. SenSys*, vol. 2, pp. 1407-1418, 2006;

W. Zhao, M. Ammar, E. Zegura, "Controlling the mobility of multiple data transport ferries in a delay-tolerant network", in: *Proc. IEEE INFOCOM*, vol. 2, pp. 1407-1418, 2005; and S. Yamamura, A. Nagata, M. Tsuru, H. Tamura, Virtual segment: "store-carry-forward relay-based support for widearea non-real-time data exchange", *Simulation Modeling Practice and Theory SIMPAT*, vol. 19, no. 1, pp. 30-46, January 2011.

SUMMARY

According to an aspect of the embodiment, an apparatus communicates with first and second terminal devices via first and second communication networks, respectively. The apparatus determines whether or not a line stability and a line speed of each of the first and second communication networks satisfy a predetermined condition. When a line stability and a line speed of each of the first and second communication networks satisfy the predetermined condition, the apparatus temporarily stores, in a memory, data received from the first terminal device via the first communication network, and transfers the temporarily stored data to the second terminal device via the second communication network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a configuration example of a message buffer, according to an embodiment;

FIG. 6 is a diagram illustrating a configuration example of an interface (IF) table, according to an embodiment;

FIG. 7 is a diagram illustrating a configuration example of a connection table, according to an embodiment;

FIG. 8 is a diagram illustrating a configuration example of a history table, according to an embodiment;

FIG. 14 is a diagram illustrating an example of settings information of messages used for connection establishment, according to an embodiment;

DESCRIPTION OF EMBODIMENTS

Figure 23:
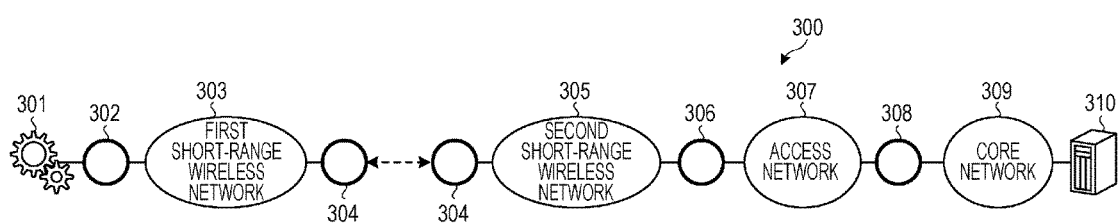
FIG. 23 is an explanatory diagram illustrating an example of an M2M information collecting system.

However, the M2M information collecting system 300 as illustrated in FIG. 23 suffers from large delay in data transfer between the machine 301 and the server 310, resulting in a decrease in transfer efficiency when transferring data from the machine 301 to the server 310 via heterogeneous communication networks.

Hereinafter, embodiments of a relay device and a relay method will be described with reference to the drawings. The embodiments are not intended to limit the scope of the disclosed technique. The embodiments described below may be combined as appropriate as long as the embodiments do not contradict each other.

First Embodiment

Figure 1:
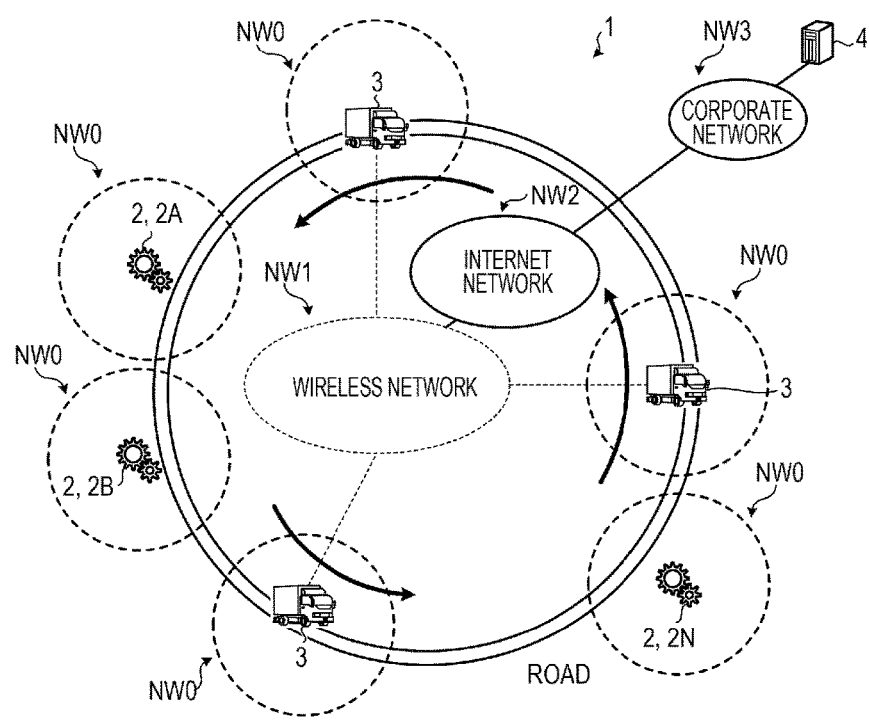
FIG. 1 is a diagram illustrating an example of a machine-to-machine (M2M) information collecting system, according to a first embodiment.

FIG. 1 is a diagram illustrating an example of a machine-to-machine (M2M) information collecting system, according to a first embodiment. An M2M information collecting system 1 includes a plurality of machines 2 (hereinafter also referred to singularly as "machine 2" when there is no desire to distinguish between individual machines 2), a short-range wireless network NW0, a mobile router 3 mounted in a vehicle, a wireless network NW1, an Internet network NW2, a corporate network NW3, and a server 4. The machine 2 is, for example, an apparatus that has a machine body such as a vending machine or digital signage, and has a communication function for transmitting data on the machine body. The short-range communication network NW0 is, for example, a network based on a short-range wireless scheme such as Wireless Fidelity (Wi-Fi; registered trademark) or Worldwide Interoperability for Microwave Access (Wi-Max; registered trademark) defined in IEEE802.11n. In the short-range wireless network NW0, the mobile router 3 communicates with the machine 2 (2A, 2B, . . . 2N) placed within a wireless area. The wireless network NW1 is, for example, a cellular phone network. The corporate network NW3 is a network of dedicated lines or the like provided by M2M business providers or the like. Although, in comparison to the wireless network NW1, the short-range wireless network NW0 has a low geographical coverage, and a low line stability indicating the degree of stable line connection opportunities, for example, the ease with which to establish or keep a communication connection, the short-range wireless network NW0 provides a high line speed.

The mobile router 3 is mounted in, for example, a vehicle for maintenance or business use that collects data on each of the machines 2. The mobile router 3 establishes a connection via the short-range wireless network NW0 with the machine 2 within the wireless area of the short-range wireless network NW0 in which the vehicle is located. Further, the mobile router 3 establishes a connection with the wireless network NW1. The vehicle in which the mobile router 3 is mounted makes rounds within the wireless area of each short-range wireless network NW0 on a regular basis, and collects data on each of the machines 2 via the short-range wireless network NW0.

The machine 2 establishes a connection via the short-range wireless network NW0 with the mobile router 3 that has entered the wireless area of the short-range wireless network NW0 in which the machine 2 is located. Then, after establishing the connection, the machine 2 transmits data in the machine 2 to the mobile router 3 via the short-range wireless network NW0.

Further, the mobile router 3 transfers the data in the machine 2 received via the short-range wireless network NW0, to the server 4 via the wireless network NW1, the Internet network NW2, and the corporate network NW3. As a result, the server 4 is able to collect data on each of the machines 2 via each corresponding short-range wireless network NW0.

Figure 2:
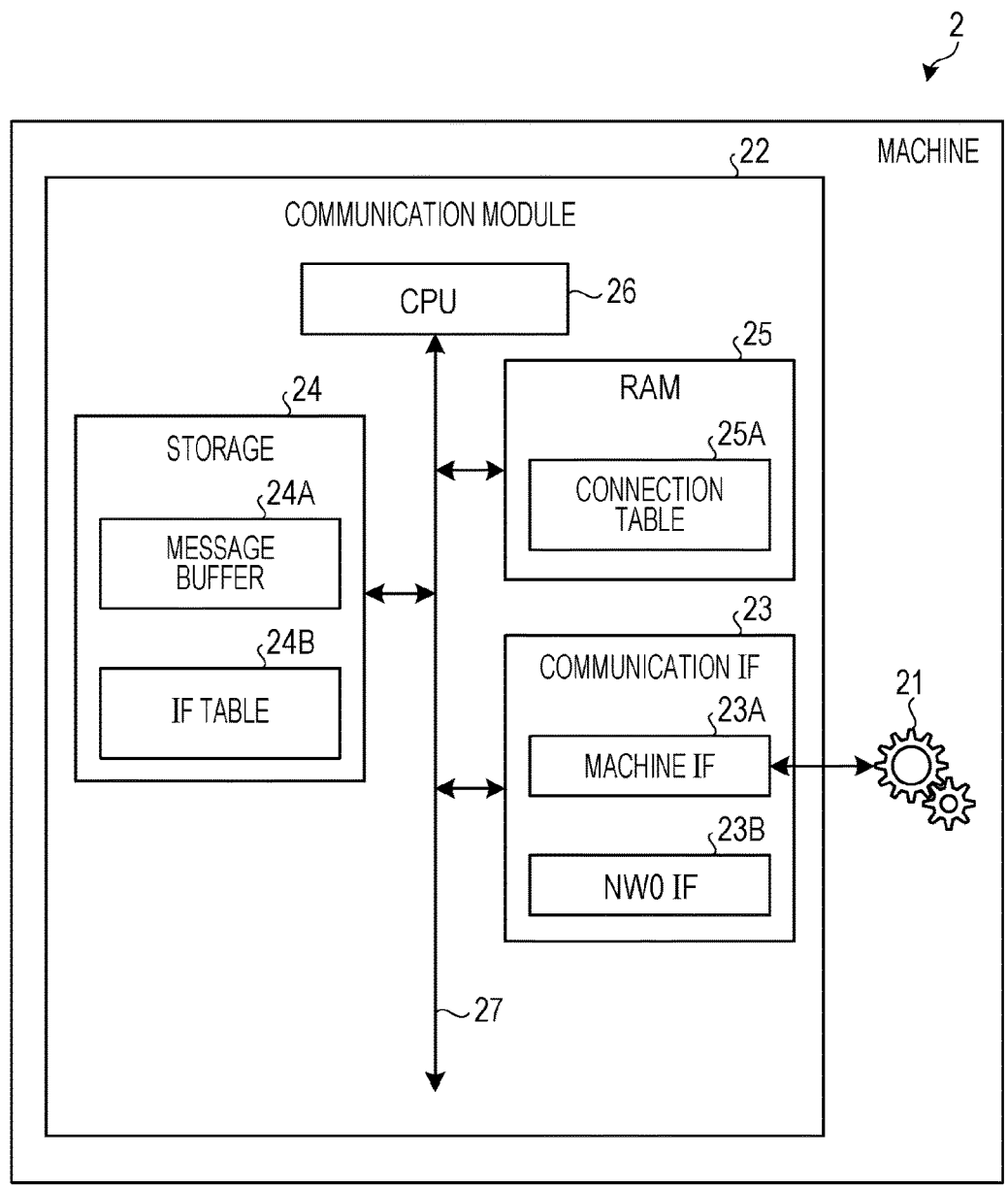
FIG. 2 is a diagram illustrating a configuration example of a machine, according to an embodiment.

FIG. 2 is a diagram illustrating a configuration example of a machine, according to an embodiment. The machine 2 illustrated as FIG. 2 includes a machine body 21, and a communication module 22. The communication module 22 includes a communication IF 23, a storage 24, a random access memory (RAM) 25, a central processing unit (CPU) 26, and a communication bus 27. The communication IF 23 includes a machine IF 23A, and a NW0 IF 23B. The machine IF 23A is a communication interface that is responsible for communication with the machine body 21. The NW0 IF 23B is a communication interface that is responsible for communication with the short-range wireless network NW0 in which the machine 2 itself is placed. The storage 24 is a non-volatile memory area that stores various kinds of information, such as a hard disk drive (HDD) or a solid state drive (SSD). A message buffer 24A and an IF table 24B are stored in the storage 24. The message buffer 24A is, for example, an area for temporarily storing information related to data received from the machine 2. The IF table 24B is a table that stores, for each communication IF, line stability and line speed for each communication network with which communication is possible. The RAM 25 is a volatile memory area for storing various kinds of information. A connection table 25A is stored in the RAM 25. The connection table 25A stores, for example, the connection status of the data destination. The CPU 26 controls the entire communication module 22 within the machine 2.

Figure 3:
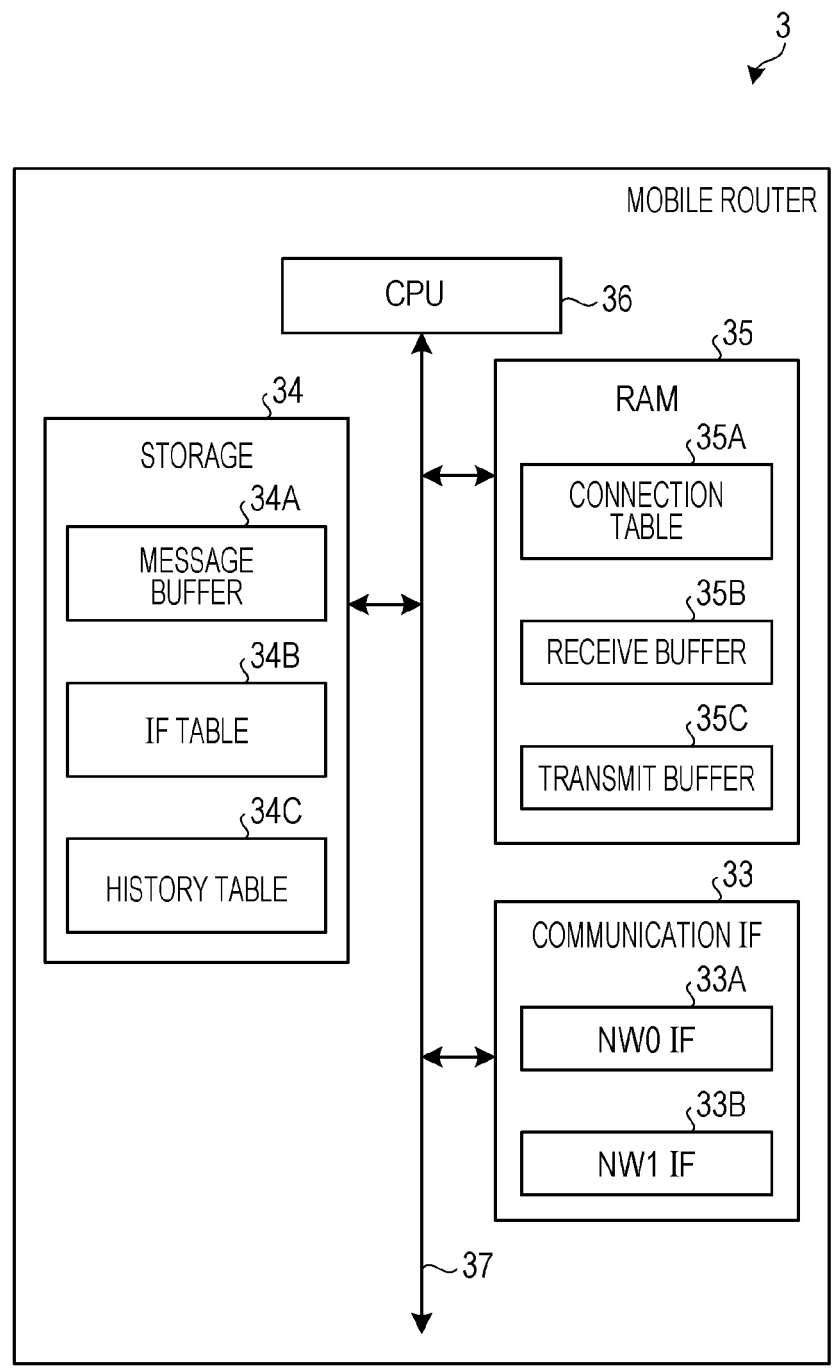
FIG. 3 is a diagram illustrating a configuration example of a mobile router, according to an embodiment.

FIG. 3 is a diagram illustrating a configuration example of a mobile router, according to an embodiment. The mobile router 3 as illustrated in FIG. 3 includes a communication IF 33, a storage 34, a RAM 35, a CPU 36, and a communication bus 37. The communication IF 33 includes a NW0 IF 33A and a NW1 IF 33B. The NW0 IF 33A is an IF that is responsible for communication with the short-range wireless network NW0. The NW1 IF 33B is an IF that is responsible for communication with the wireless network NW1. A message buffer 34A, an IF table 34B, and a history table 34C are stored in the storage 34. The message buffer 34A is an area for temporarily storing information related to data received from the machine 2. The IF table 34B is a table that stores, for each communication IF, line stability and line speed for each communication network with which communication is possible. The history table 34C is, for example, a table that stores history information on the other party that has communicated with the mobile router 3. A connection table 35A, a receive buffer 35B, and a transmit buffer 35C are stored in the RAM 35. The connection table 35A is a table for managing the connection status of the data destination. The receive buffer 35B is an area for sequentially storing data received from the machine 2 via the short-range wireless network NW0 through the NW0 IF 33A. The transmit buffer 35C is an area for sequentially storing data to be transmitted to the server 4 via the wireless network NW1 through the NW1 IF 33B. Each of the receive buffer 35B and the transmit buffer 35C has a finite storage area, and overflowing data is discarded. The CPU 36 controls the entire mobile router 3.

Figure 4:
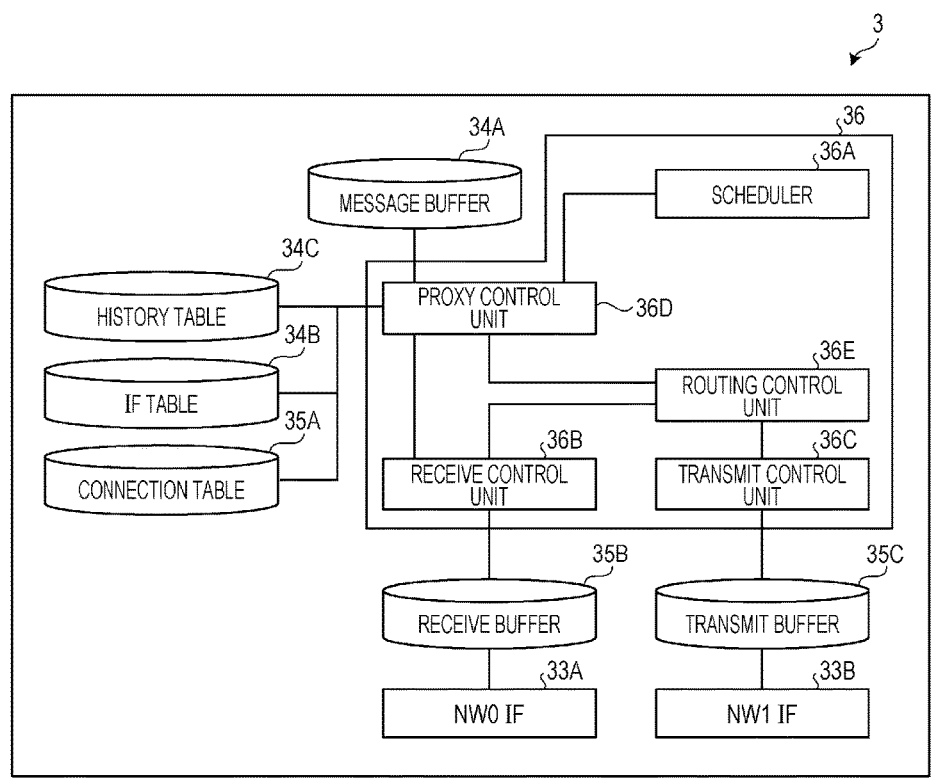
FIG. 4 is a diagram illustrating an example of processes executed in a mobile router, according to an embodiment.

FIG. 4 is a diagram illustrating an example of processes executed in a mobile router, according to an embodiment. FIG. 4 illustrates an example of processes executed by the CPU 36 in the mobile router 3. While FIG. 4 illustrates an example of processes executed by the CPU 36 of the mobile router 3, the same processes are executed also, for example, by the CPU 26 in the machine 2 or by a CPU 46 in the server 4. In FIG. 4, the CPU 36 reads a transfer program stored in the storage 34, and executes processes for various functions on the basis of the transfer program that has been read. For example, the CPU 36 includes, as processes for various functions, a scheduler 36A, a receive control unit 36B, a transmit control unit 36C, a proxy control unit 36D, and a routing control unit 36E.

The scheduler 36A functions as a process for managing a schedule. The scheduler 36A is a program that is interrupted by the proxy control unit 36D at a designated time. The scheduler 36A is used in determining whether a life time (validity time) is up in an asynchronous transfer process that will be described later.

The receive control unit 36B functions as a process for controlling the receiver buffer 35B. The receive control unit 36B is a program including an application IF for a communication program, and a control driver for the NW0 IF 33A. The receive control unit 36B communicates by using an IP address and an application-specific port number.

Further, the transmit control unit 36C functions as a process for controlling the transmit buffer 35C. The transmit control unit 36C is a program including an application IF for a communication program, and a control driver for the NW1 IF 33B. The transmit control unit 36C communicates by using an IP address and an application-specific port number.

The proxy control unit 36D functions as a process that acts on behalf of the machine 2 and communicates with the server 4. The proxy control unit 36D manages the message buffer 34A, the IF table 34B, the history table 34C, and the connection table 35A.

The routing control unit 36E functions as a process for controlling the proxy control unit 36D, the receive control unit 36B, and the transmit control unit 36C. The routing control unit 36E is a program that determines a communication IF on the output side of the data to be transferred. The routing control unit 36E includes a routing table (not illustrated) for determining the destination, and retrieves, from the routing table, the output-side communication IF corresponding to the destination address of the data to be transferred. Since it is assumed that communication is performed with heterogeneous communication networks, the routing control unit 36E selects the output-side communication IF from among a plurality of communication IFs.

FIG. 5 is a diagram illustrating a configuration example of a message buffer, according to an embodiment. The message buffer 34A as illustrated in FIG. 5 manages message identification 341A, destination identification 342A, life time 343A, and message body 344A in association with each other. The message identification 341A is an ID that identifies data. The destination identification 342A is an ID that identifies the destination of data. The life time 343A is an arrival time limit within which data desirably arrives at the server 4, and which is used for an asynchronous transfer process. The message body 344A is a description of data. The proxy control unit 36D retrieves information in the message buffer 34 using the destination identification 342A, for example.

FIG. 6 is a diagram illustrating a configuration example of an interface (IF) table, according to an embodiment. The IF table 34B as illustrated in FIG. 6 manages IF identification 341B, line stability 342B, and line speed 343B in association with each other, as information related to the communication IF for a communication network with which communication is possible. The IF identification 341B is an ID that identifies the communication IF for a communication network with which communication is possible. The line stability 342B is the degree of connection opportunities for a line with respect to a communication network. For example, a wired network that is able to communicate at all times, except for disconnections due to a line fault, may be said to be a communication network with high line stability. Although greatly depending on the geographical coverage, the wireless network NW1 may be also said to be a communication network with the second highest line stability next to a wired network. In contrast, because the short-range wireless network NW0 is a communication network that is used temporarily while on the move, the short-range wireless network NW0 may be said to be a communication network with low line stability. The line stability 342B may be ranked for each communication network as appropriate by an operator's operation. Alternatively, as for the ranking of the line stability 342B, a communication history may be recorded by a program, and the ranking may be changed dynamically on the basis of the duration of communication for each communication network based on the communication history. In the case of the first embodiment, the ranking of the line stability, from highest to lowest, is in the order of the corporate network NW3, the Internet network NW2, the wireless network NW1, and the short-range wireless network NW0.

The line speed 343B is the line speed of a communication network. For example, the line speed of the short-range wireless network NW0 such as Wi-Fi is assumed to be approximately 20 Mbps, and the line speed of the wireless network NW1 is assumed to be approximately 300 kbps. While, for example, a numerical value obtained from the catalog specifications of a communication network or the average value of the actual measured data is set by operator's operation as the line speed 343B, the line speed 343B may be set dynamically by periodically measuring line speed by using measurement packets. The proxy control unit 36D retrieves information in the IF table 34B using the IF identification 341B, for example.

FIG. 7 is a diagram illustrating a configuration example of a connection table, according to an embodiment. The connection table 35A as illustrated in FIG. 7 manages not the physical link status of a communication IF but the connection status for each data destination. The connection table 35A manages destination identification 351A and connection status 352A in association with each other. The destination identification 351A is an ID that identifies the communication apparatus at the data destination. The connection status 352A identifies the connection status of the communication apparatus at the data destination. The connection status 352A includes, for example, "online", "offline", and "proxy". The "online" is a communication status in which a connection to the data destination exists and communication with the data destination is immediately possible. The "offline" is a communication status in which a connection to the data destination does not exist. The "proxy" is a communication status in which the connection between the machine 2 and the server 4 is terminated at the mobile router 3, and the mobile router 3 acts on behalf of the machine 2 and communicates with the server 4. The proxy control unit 36D retrieves information in the connection table 35A by using the destination identification 351A.

FIG. 8 is a diagram illustrating a configuration example of a history table, according to an embodiment. The history table 34C as illustrated in FIG. 8 manages IF identification 341C, and contact history 342C in association with each other, as history information on the communication apparatus of the other party with which communication has been performed in the past. The contact history 342C manages terminal identification 343C, line stability 344C, and line speed 345C with respect to the communication apparatus of the other party in association with each other. The terminal identification 343C is an ID that identifies the communication apparatus of the other party. The line stability 344C is the line stability of a communication network with which the communication apparatus of the other party is able to communicate. The line speed 345C is the line speed of a communication network with which the communication apparatus of the other party is able to communicate. The proxy control unit 36D retrieves information in the history table 34C by using the IF identification 341C.

Figure 9:
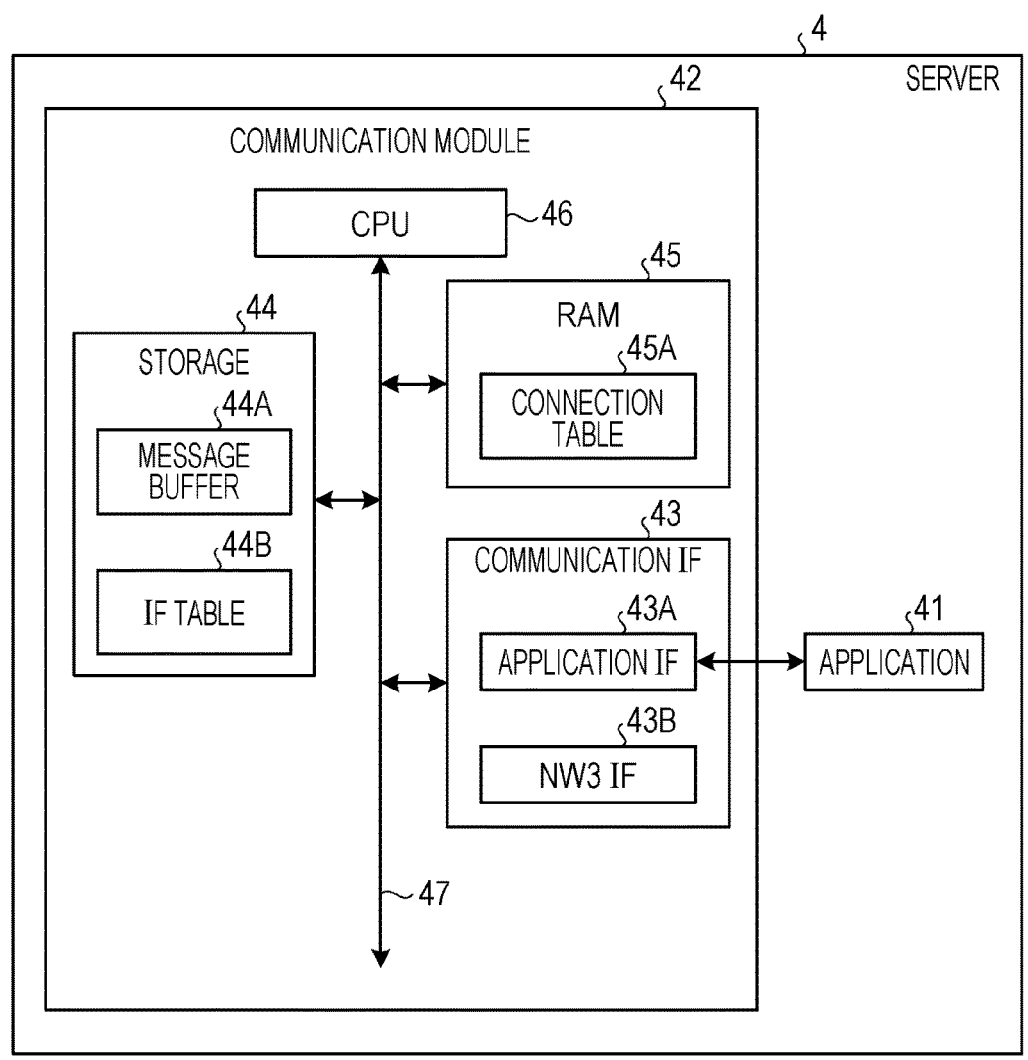
FIG. 9 is a diagram illustrating a configuration example of a server, according to an embodiment.

FIG. 9 is a diagram illustrating a configuration example of a server, according to an embodiment. The server 4 illustrated as FIG. 9 includes an application 41, and a communication module 42. For example, in a case where the machine 2 is a vending machine, the application 41 is a collecting application that collects data on the vending machine, or the like. The communication module 42 includes a communication IF 43, a storage 44, a RAM 45, a CPU 46, and a communication bus 47. The communication IF 43 includes an application IF 43A, and a NW3 IF 43B. The application IF 43A is an IF that is responsible for communication with the application 41. The NW3 IF 43B is an IF that is responsible for communication with the corporate network NW3. The storage 44 includes a message buffer 44A, and an IF table 44B. The message buffer 44A manages information related to data received via the corporate network NW3. The IF table 44B manages IF identification that identifies the communication IF for a communication network with which communication is possible, and the line stability and line speed of the communication network, in association with each other. The RAM 45 is a volatile memory area for storing various kinds of information. A connection table 45A is stored in the RAM 45. The connection table 45A stores, for example, the connection status of the data destination. The CPU 46 controls the entire server 4.

Figure 10:
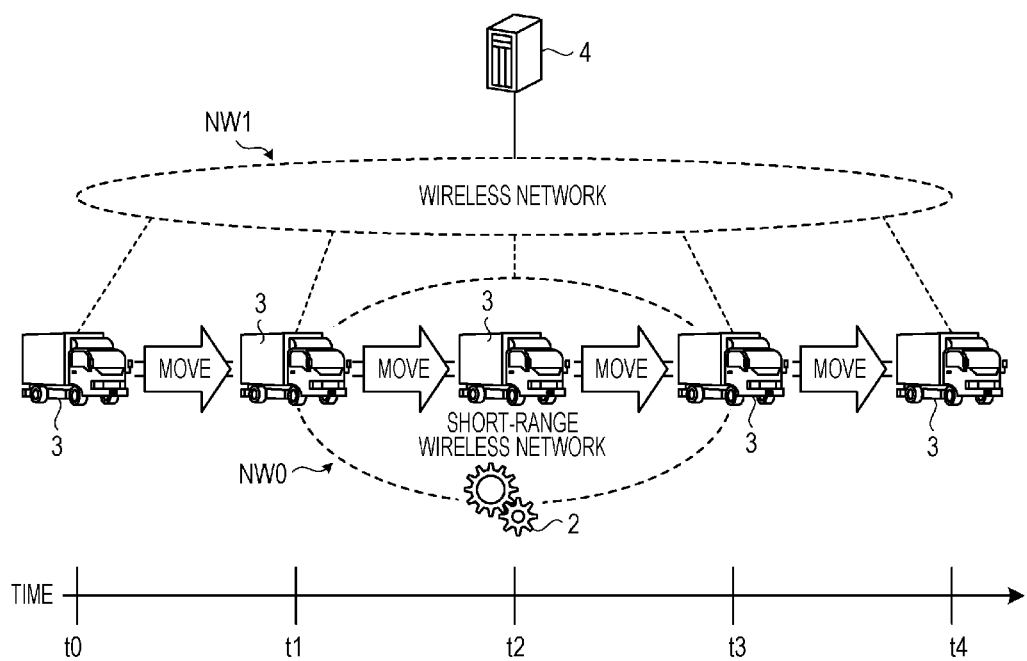
FIG. 10 is a schematic diagram illustrating an example of relationship between a position of a vehicle equipped with a mobile router and time transition, according to an embodiment.

FIG. 10 is a schematic diagram illustrating an example of relationship between a position of a vehicle equipped with a mobile router and time transition, according to an embodiment. At time t0, the vehicle in which the mobile router 3 is mounted is at a position where the vehicle has not yet entered the short-range wireless network NW0. At time t1, the vehicle is at a position where the vehicle has entered the short-range wireless network NW0. At time t2, the vehicle is at a position where the vehicle is passing through the short-range wireless network NW0. At time t3, the vehicle is at a position where the vehicle leaves the short-range wireless network NW0. At time t4, the vehicle is at a position where the vehicle has left the short-range wireless network NW0.

Figure 11A:
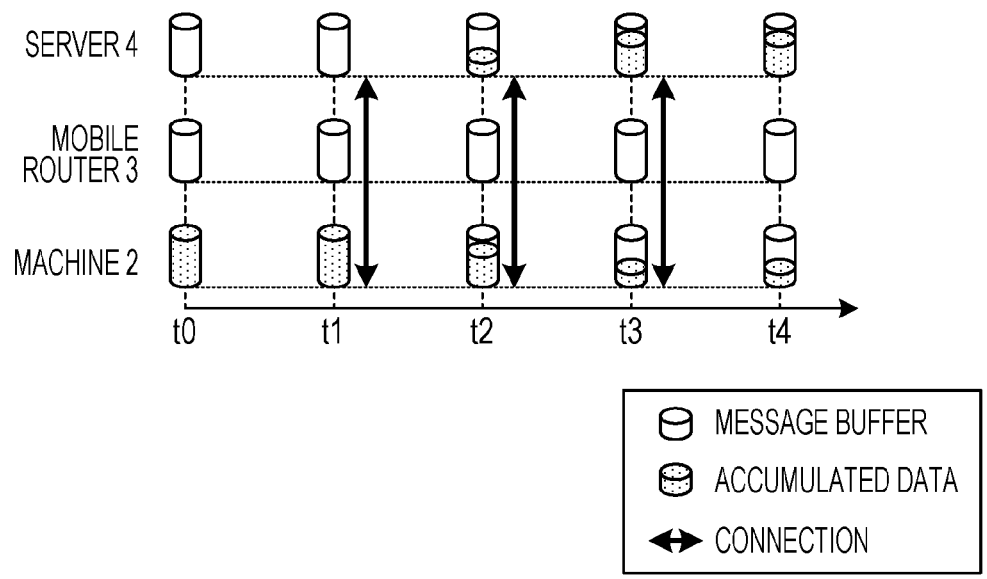
FIG. 11A is a schematic diagram illustrating a comparative example of a transition of amount of data transferred.

FIG. 11A is a schematic diagram illustrating a comparative example of a transition of amount of data transferred. FIG. 11A illustrates, in the time series, a transition of amount of data that is transferred from the machine 2 to the server 4 by using the mobile router 3. The comparative example as illustrated in FIG. 11A does not consider the line characteristics of the short-range wireless network NW0 between the machine 2 and the mobile router 3, and the wireless network NW1 between the mobile router 3 and the server 4. In the comparative example, data temporarily stored in the machine 2 is not buffered in the mobile router 3 but the data is transferred to the server 4 by a connection between the machine 2 and the server 4. At time t1 illustrated in FIG. 10, the mobile router 3 establishes a connection between the machine 2 and the server 4. Then, the machine 2 starts transfer of data that is full (3/3) to the server 4. Further, at time t2, the mobile router 3 transfers one-third of data to the server 4. However, two-thirds of data remain in the machine 2. Then, at time t3, the mobile router 3 transfers the remaining one-third of data to the server 4 from the machine 2. As a result, one-third of data remains in the machine 2, and two-thirds of data have been transferred to the server 4. However, at time t4, the connection between the machine 2 and the server 4 has been cut off, and thus one-third of data remains in the machine 2. That is, it is not possible to complete transfer of the data in the machine 2 to the server 4 until the connection between the machine 2 and the server 4 is established again.

In the comparative example in FIG. 11A, the line speed of the wireless network NW1 between the mobile router 3 and the server 4 is slow in comparison to the line speed of the short-range wireless network NW0 between the machine 2 and the mobile router 3, and therefore the transfer speed is limited. As a result, in a case where the mobile router 3 collects data from the machine 2 located nearby while moving, it may be said that there is a limit to the amount of data that is transferrable within a limited communication time.

Figure 11B:
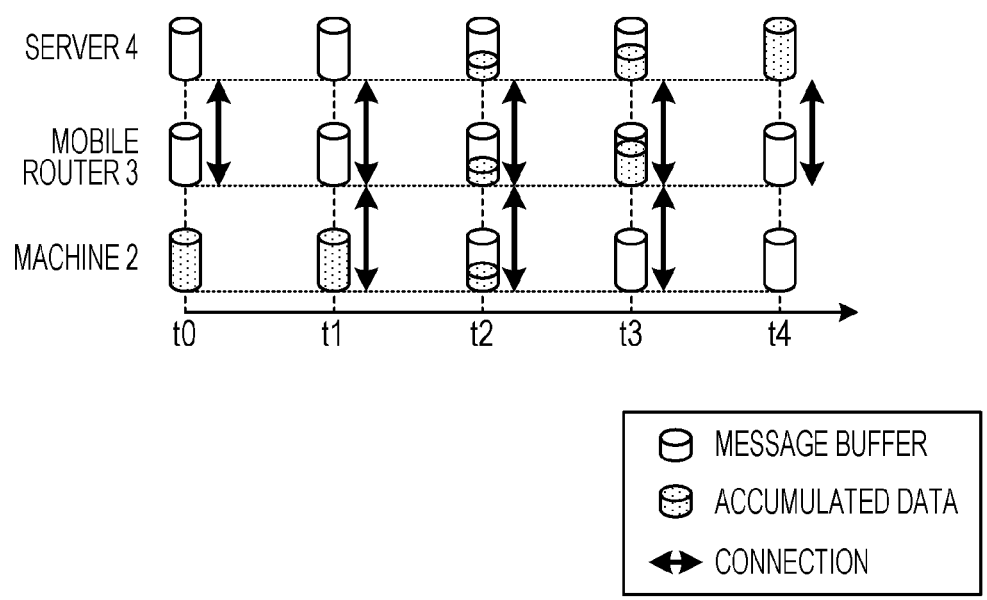
FIG. 11B is a schematic diagram illustrating an example of a transition of amount of data transferred, according to an embodiment.

In contrast, FIG. 11B is an explanatory diagram of the first embodiment that schematically illustrates the transition of the amount of data transferred in the time series when transferring data from the machine 2 to the server 4 by using the mobile router 3. In the first embodiment illustrated in FIG. 11B, the line characteristics of the short-range wireless network NW0 and wireless network NW1 are taken into consideration. That is, a predetermined condition that the line stability of the wireless network NW1 is higher than that of the short-range wireless network NW0, and that the line speed of the wireless network NW1 is slower than that of the short-range wireless network NW0 is taken into consideration. As a result, when the predetermined condition is satisfied, the mobile router 3 buffers data accumulated in the machine 2, into the mobile router 3. Then, even when the link with the machine 2 is down, the mobile router 3 sequentially transfers the buffered data to the server 4. For example, at time to, although the connection between the mobile router 3 and the server 4 is established, the connection between the mobile router 3 and the machine 2 is not established. At this time, it is assumed that data accumulated in the machine 2 is full (3/3). Then, at time t1, with the connection between the server 4 and the mobile router 3 being established as it is, the connection between the mobile router 3 and the machine 2 is established. At this time, the amount of data in the machine 2 at time t1 is the same as that of the comparative example illustrated in FIG. 11A.

Then, at time t2, as in the comparative example, one-third of data is transferred from the machine 2 to the server 4. However, the mobile router 3 buffers another one-third of data from the machine 2. As a result, at time t2, the amount of data in the machine 2 is one-third. Further, at time t3, the remaining one-third of data in the machine 2 is buffered in the mobile router 3, and thus the amount of data in the machine 2 becomes "0". Then, at time t4, even though the connection between the mobile router 3 and the machine 2 has been cut off, the connection between the mobile router 3 and the server 4 is maintained. Therefore, the mobile router 3 sequentially transfers the buffered two-thirds of data to the server 4. As a result, at time t4, although only two-thirds of data have been successfully transferred to the server 4 in the comparative example, transfer of all 3/3 of data to the server 4 has been completed in the first embodiment.

Figure 12:
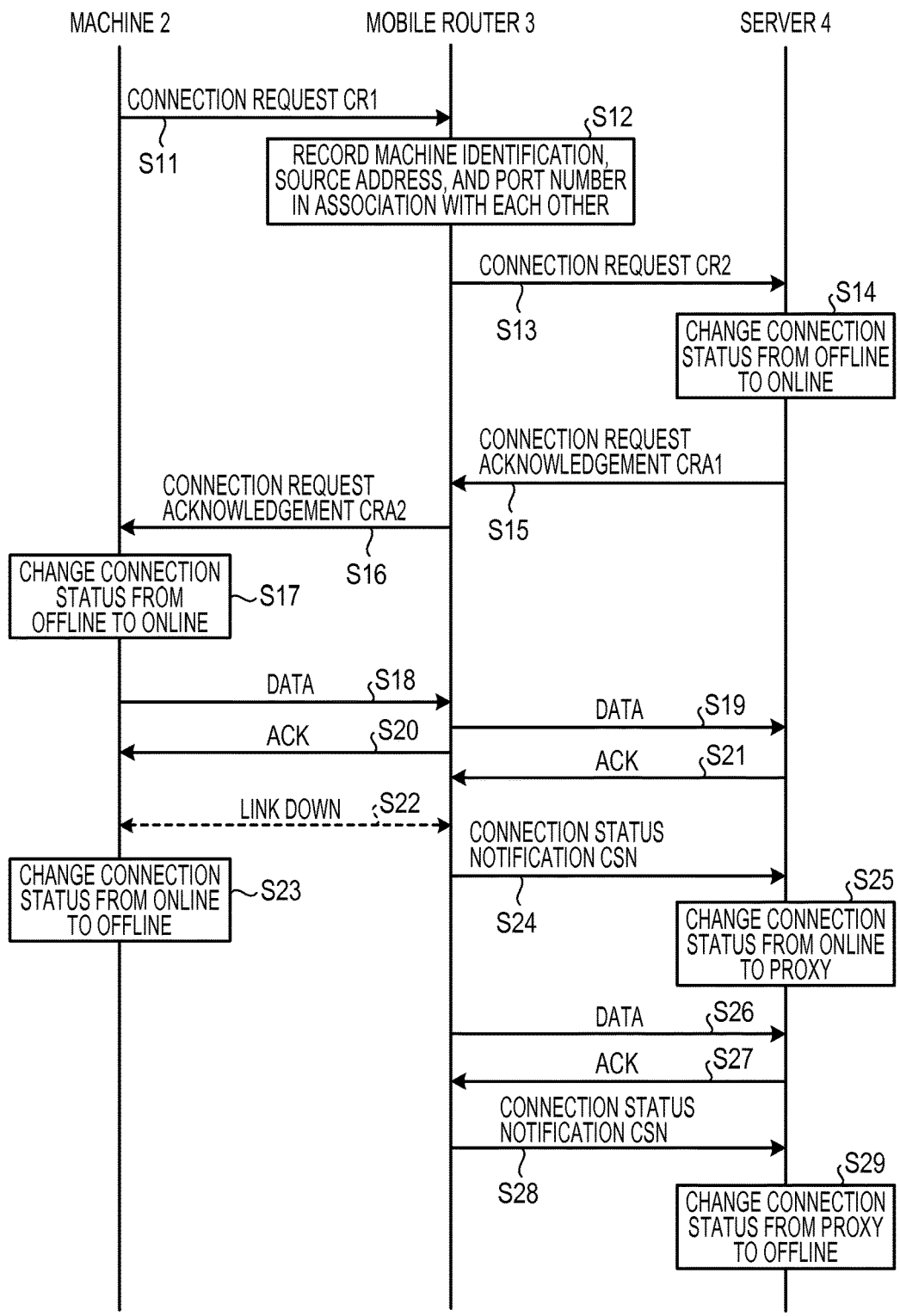
FIG. 12 is a diagram illustrating an example of an operational sequence for a M2M information collecting system, according to a first embodiment.

Next, operation of the M2M information collecting system 1 according to the first embodiment will be described. FIG. 12 is a diagram illustrating an example of an operational sequence for a M2M information collecting system, according to a first embodiment. FIG. 12 illustrates an example of an operational sequence among the machine 2, mobile router 3, and server 4 in the M2M information collecting system 1. The machine 2 illustrated in FIG. 12 broadcasts a connection request (CR1) within the short-range wireless network NW0 in which the machine 2 is placed (step S11).

When the mobile router 3 receives the connection request (CR1), the mobile router 3 stores a machine identification contained in the connection request (CR1) and identifying the machine 2, and a source address and a port number of the machine 2 contained in the TCP/IP header, into the RAM 35 in association with each other (step S12).

Once the machine identification, the source address, and the port number within the connection request (CR1) are stored, the mobile router 3 transmits a connection request (CR2) to the server 4 via the wireless network NW1, the Internet network NW2, and the corporate network NW3 (step S13).

Further, the server 4 changes the status of connection with the machine 2 that is stored in the connection table 45A in the RAM 45, from "offline" to "online" (step S14). The server 4 transmits a connection request acknowledgement (CRA1) to the mobile router 3 (step S15). When the mobile router 3 receives the connection request acknowledgement (CRA1), the mobile router 3 transmits a connection request acknowledgement (CRA2) to the machine 2 (step S16). Then, when the machine 2 receives the connection request acknowledgement (CRA2), the machine 2 changes the status of connection with the server 4 that is stored in the connection table 25A in the RAM 25, from "offline" to "online" (step S17).

The machine 2 transmits data accumulated in the message buffer 24A in the storage 24 to the mobile router 3 (step S18). Now that the connection with the mobile router 3 via the short-range wireless network NW0 has been established, the machine 2 transmits accumulated data to the mobile router 3 at high speed. The mobile router 3 transfers data received from the machine 2 to the server 4 (step S19). Further, the mobile router 3 transmits an acknowledgement (ACK) for the data received from the machine 2 to the machine 2 (step S20). In addition, the server 4 also transmits an acknowledgement (ACK) for the data received from the mobile router 3 to the mobile router 3 (step S21).

Next, when the machine 2 detects a link down with the mobile router 3 (step S22), the machine 2 changes the status of connection with the server 4 that is held in the connection table 25A in the RAM 25, from "online" to "offline" (step S23). A link down between the machine 2 and the mobile router 3 occurs when, for example, the vehicle in which the mobile router 3 is mounted has left the wireless area of the short-range wireless network NW0, and the connection between the machine 2 and the mobile router 3 has been cut off.

When the mobile router 3 detects a link down with the machine 2 in step S22, the mobile router 3 sends a connection status notification (CSN) to the server 4 (step S24). The connection status notification (CSN) notifies the server 4 of the fact that the current status is a proxy status in which the mobile router 3 acts on behalf of the machine 2, when a link down with the machine 2 is detected.

When the server 4 receives the connection status notification (CSN), the server 4 changes the status of connection with the machine 2 within the connection table 45A in the RAM 45, from "online" to "proxy" (step S25). Further, when there is data from the machine 2 that is being stored in the message buffer 34A, the mobile router 3 transfers this data to the server 4 (step S26). Then, when the server 4 receives the data, the server 4 transmits an acknowledgement (ACK) for the data to the mobile router 3 (step S27). As a result, even if the connection with the machine 2 is cut off, the mobile router 3 is able to transfer the data temporarily stored in the message buffer 34A to the server 4 via the wireless network NW1, the Internet network NW2, and the corporate network NW3.

Then, once there is no more data temporarily stored in the message buffer 34A, the mobile router 3 sends a connection status notification (CSN) for notifying that the current status is offline, to the server 4 (step S28). When the server 4 receives the connection status notification (CSN), the server 4 changes the status of connection with the machine 2 that is held in the connection table 45A in the RAM 45, from "proxy" to "offline" (step S29), and terminates the processing as illustrated in FIG. 12 is ended.

The mobile router 3 illustrated in FIG. 12 establishes a connection between the machine 2 and the server 4, and transfers data from the machine 2 to the server 4. As a result, the mobile router 3 is able to transfer the data from the machine 2 to the server 4 via heterogeneous communication networks.

When the mobile router 3 detects a link down with the machine 2 during communication between the machine 2 and the server 4, the mobile router 3 acts on behalf of the machine 2 and notifies the server 4 of the connection status (proxy) of the machine 2. As a result, the server 4 is able to recognize the connection status of the machine 2, thereby avoiding redundant transmission of message commands to the machine 2 with which the link is down and which is in a proxy state.

Figure 13:
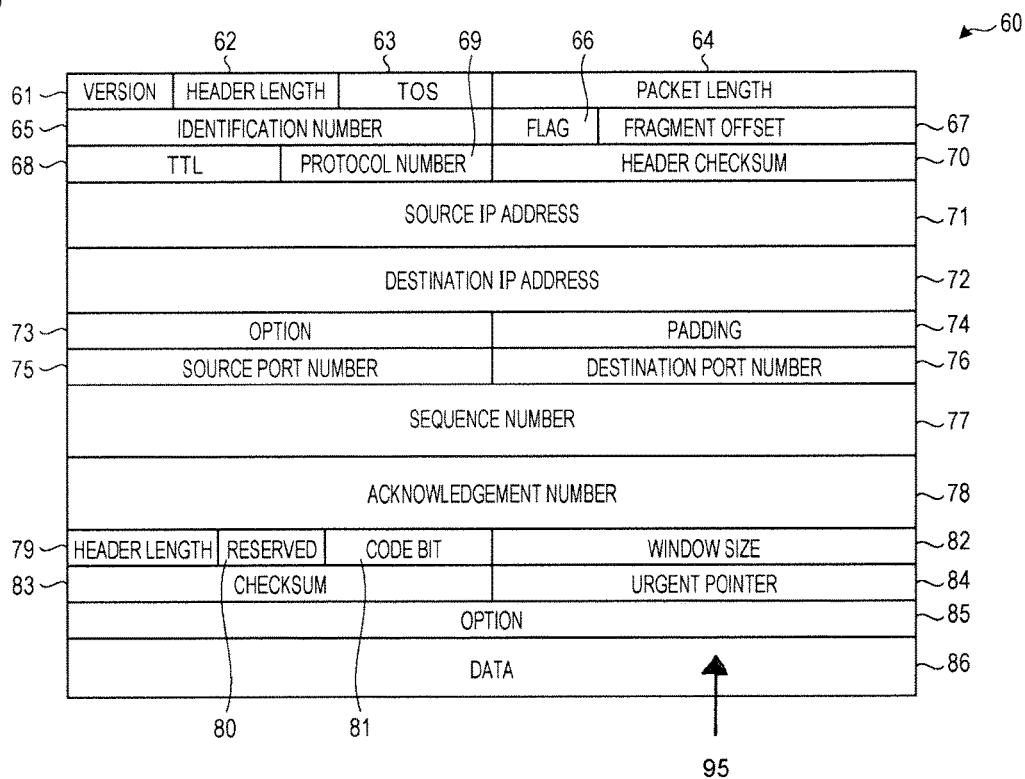
FIG. 13 is a diagram illustrating an example of a TCP/IP datagram of a message used for connection establishment, according to an embodiment.

FIG. 13 is a diagram illustrating an example of a TCP/IP datagram of a message used for connection establishment, according to an embodiment. A message 60 illustrated in FIG. 13 includes version 61, header length 62, Type of Service (TOS) 63, packet length 64, identification number 65, flag 66, fragment offset 67, Time to Live (TTL) 68, protocol number 69, and header checksum 70. The version 61 is a piece of information that identifies a protocol. The header length 62 is a piece of information that identifies the length of an IP header. The TOS 63 is a piece of information that determines the priority of an IP packet. The packet length 64 is a piece of information indicating the length of the entire packet including the IP header and data. The identification number 65 is a number that identifies a segment packet. The flag 66 is a piece of information used for controlling segmentation of the IP packet. The fragment offset 67 is a piece of information indicating the position where a segment packet is located in the original data. The TTL 68 is a piece of information indicating the lifetime of a packet. The protocol number 69 is a piece of information that identifies the upper layer protocol of IP. The header checksum 70 is a piece of information for checking whether or not there is an error in the IP header.

The message 60 further includes source IP address 71, destination IP address 72, option 73, padding 74, source port number 75, destination port number 76, sequence number 77, acknowledgement number 78, and header length 79. The source IP address 71 is the IP address of the packet's source. The destination IP address 72 is the IP address of the packet's destination. The option 73 is a piece of information that specifies the option to be added to the IP packet. The padding 74 is an additional area for making an adjustment to size of an area for the option 73 by padding the additional area with value "0" so that the size of the area becomes multiples of four bytes at the time of specifying the option 73. The source port number 75 is the port number of the packet's source. The destination port number 76 is the port number of the packet's destination. The sequence number 77 is a piece of information that identifies the sequence of data. The acknowledgement number 78 is a piece of information that identifies the position of received data. The header length 79 is a piece of information indicating the length of the IP header.

The message 60 further includes reserved 80, code bit 81, window size 82, checksum 83, urgent pointer 84, option 85, and data 86. The reserved 80 represents reserved bits. The code bit 81 is a piece of information for identifying a code. The window size 82 is a piece of information used for informing the other party of the window size on the receiving side. The checksum 83 is a piece of information for checking the integrity of a packet. The urgent pointer 84 is a piece of information indicating whether or not urgent data is contained in the packet. The option 85 is a piece of information used for setting various characteristics in the TCP connection. The data 86 is the body of data.

FIG. 14 is a diagram illustrating an example of settings information of messages used for connection establishment, according to an embodiment. A connection request (CR1) is a message transmitted from the machine 2 to the mobile router 3 via the short-range wireless network NW0. Source IP address 91 of the connection request (CR1) is the IP address of the machine 2, destination IP address 92 is broadcast, source port number 93 is an arbitrary port number, and destination port number 94 is a proxy port number.

Further, data 95 of the connection request (CR1) includes message type, machine identification, server identification, and server port number, or the like.

A connection request (CR2) is a message transmitted from the mobile router 3 to the server 4 via the wireless network NW1. The source IP address 91 of the connection request (CR2) is the IP address of the mobile router 3, the destination IP address 92 is the IP address of the server 4, the source port number 93 is an arbitrary port number, and the destination port number 94 is an application port number. Further, the data 95 of the connection request (CR2) includes message type, machine identification, server identification, and server port number, or the like.

A connection request acknowledgement (CRA1) is a message transmitted from the server 4 to the mobile router 3 via the wireless network NW1. The source IP address 91 of the connection request acknowledgement (CRA1) is the IP address of the server 4, the destination IP address 92 is the IP address of the mobile router 3, the source port number 93 is an arbitrary port number, and the destination port number 94 is an arbitrary port number. Further, the data 95 of the connection request acknowledgement (CRA1) includes message number and machine type, or the like.

A connection request acknowledgement (CRA2) is a message transmitted from the mobile router 3 to the machine 2 via the short-range wireless network NW0. The source IP address 91 of the connection request acknowledgement (CRA2) is the IP address of the mobile router 3, the destination IP address 92 is the IP address of the machine 2, the source port number 93 is an arbitrary port number, and the destination port number 94 is an arbitrary port number. Further, the data 95 of the connection request acknowledgement (CRA2) includes message type and machine identification, or the like.

A connection status notification (CSN) is a message transmitted from the mobile router 3 to the server 4 via the wireless network NW1. The source IP address 91 of the connection status notification (CSN) is the IP address of the mobile router 3, the destination IP address 92 is the IP address of the server 4, the source port number 93 is an arbitrary port number, and the destination port number 94 is an application port number. Further, the data 95 of the connection status notification (CSN) includes message type, machine identification information, and connection status, or the like.

Figure 15:
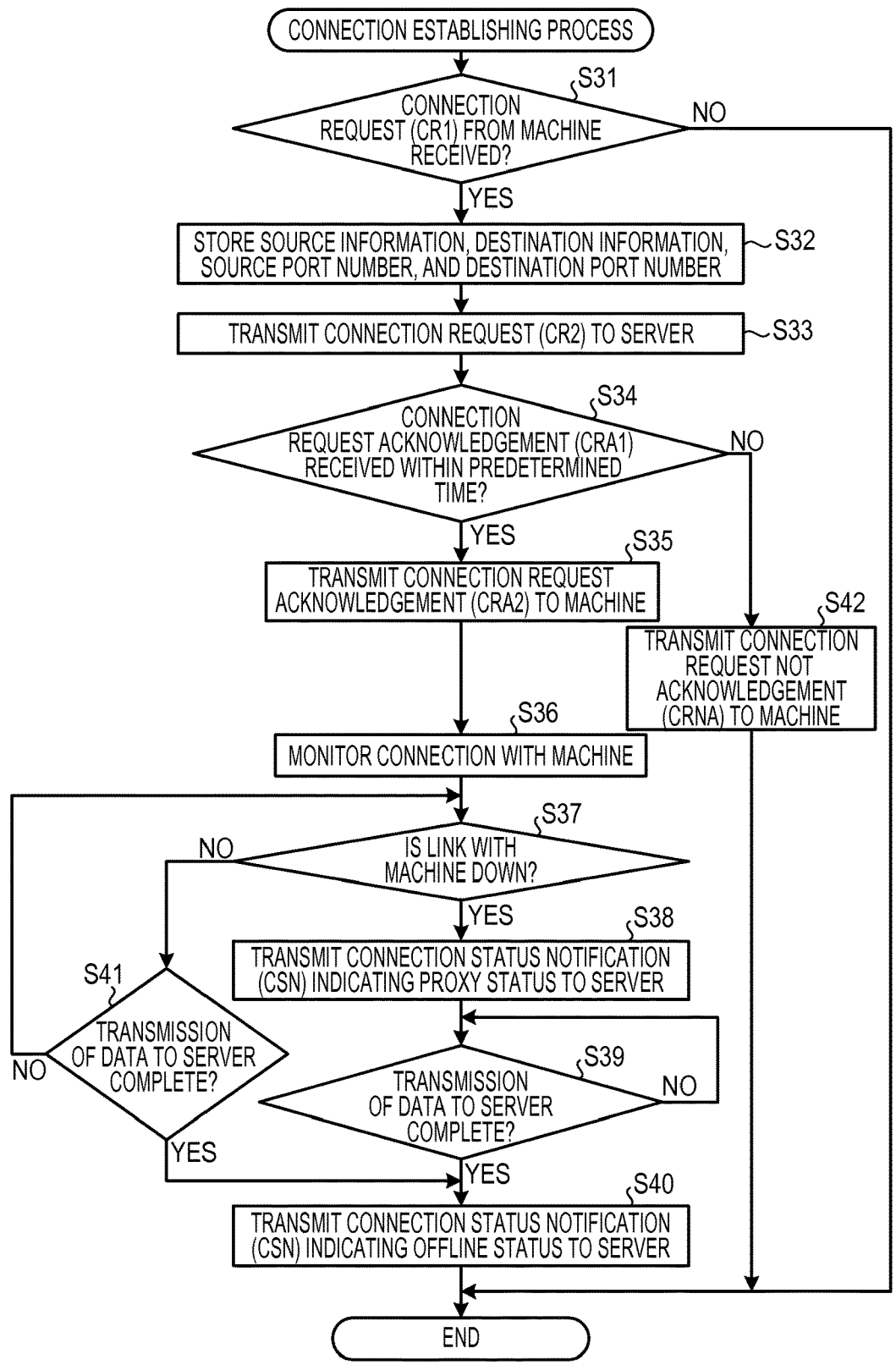
FIG. 15 is a diagram illustrating an example of an operational flowchart for connection establishing process by a mobile router, according to a first embodiment.

FIG. 15 is a diagram illustrating an example of an operational flowchart for connection establishing process by a mobile router, according to a first embodiment. FIG. 15 illustrates an example of the processing of the CPU 36 of the mobile router 3 with respect to a connection establishing process according to the first embodiment. In FIG. 15, the proxy control unit 36D of the CPU 36 in the mobile router 3 determines whether or not a connection request (CR1) has been received from the machine 2 (step S31). When the connection request (CR1) has been received (step S31: Yes), the proxy control unit 36D stores source information, destination information, source port number, and destination port number, which are contained in the connection request (CR1) (step S32). The routing control unit 36E obtains the IP address of the server 4 from the server identification set in the data 95 of the connection request (CR1), and determines the NW1 IF 33B of the wireless network NW1 as the output-side communication IF.

The proxy control unit 36D transmits a connection request (CR2) to the server 4 through the NW1 IF 33B (step S33). That is, the proxy control unit 36D generates a new connection request (CR2) that copies the data 95 of the connection request (CR1) as it is. Then, the proxy control unit 36D transmits the generated connection request (CR2) to the server port whose number is set in the data 95 of the connection request (CR1). Then, when the server 4 receives the connection request (CR2) through the NW3 IF 43B, the server 4 sets the connection status of the corresponding entry within the connection table 45A to "offline" on the basis of the machine identification information in the connection request (CR2).

The proxy control unit 36D determines whether or not a connection request acknowledgement (CRA1) for the connection request (CR2) has been received within a predetermined time (step S34). When the connection request acknowledgement (CRA1) has been received (step S34: Yes), the proxy control unit 36D transmits a connection request acknowledgement (CRA2) to the machine 2 (step S35). Here, the proxy control unit 36D generates a new connection request acknowledgement (CRA2) by copying the data 95 of the connection request acknowledgement (CRA1) as it is. Then, the proxy control unit 36D searches the source information stored in step S32 by using the machine identification information in the CRA1, sets the corresponding machine 2 as the destination of the connection request acknowledgement (CRA2), and transmits the connection request acknowledgement (CRA2). As a result, when the machine 2 receives the connection request acknowledgement (CRA2), the machine 2 starts transmitting data to the source IP address and the source port number contained in the TCP/IP header of the connection request acknowledgement (CRA2).

The proxy control unit 36D monitors the connection with the machine 2 on the basis of periodic transmission of a keep alive to the machine 2 and whether or not there is a response (step S36). The proxy control unit 36D determines whether or not a link down with the machine 2 has been detected on the basis of the connection monitoring results (step S37). The proxy control unit 36D detects a link down with the machine 2 when there is no response to the keepalive, or when a connection cut-off notification has been detected.

When the proxy control unit 36D has detected a link down with the machine 2 (step S37: Yes), the proxy control unit 36D transmits a connection status notification (CSN) indicating change of the connection status to "proxy", to the server 4 (step S38). The proxy control unit 36D transmits the connection status notification (CSN) toward the application port of the server 3. The proxy control unit 36D may also maintain a proxy state on the basis of a predetermined policy.

The proxy control unit 36D determines whether or not transmission of data to the server 4 is complete (step S39). When transmission of data to the server 4 is complete (step S39: Yes), the proxy control unit 36D transmits a connection status notification (CSN) indicating change of the connection status to "offline", to the server 4 (step S40), and terminates the processing illustrated in FIG. 15. When the server 4 receives the connection status notification (CSN), the server 4 sets the connection status of the connection status notification (CSN) to the corresponding entry in the connection table 45A on the basis of machine identification information.

When the connection request (CR1) from the machine 2 has not been received (step S31: No), the proxy control unit 36D terminates the processing illustrated in FIG. 15.

When a link down with the machine 2 has not been detected (step S37: No), the proxy control unit 36D determines whether or not transmission of data to the server 4 is complete (step S41). When transmission of data to the server 4 is complete (step S41: Yes), the proxy control unit 36D proceeds to step S40, in order to transmit a connection status notification (CSN) indicating change of the connection status to "offline", to the server 4. When transmission of data to the server 4 is not complete (step S41: No), the proxy control unit 36D proceeds to step S37, in order to determine whether or not a link down with the machine 2 has been detected.

When the connection request acknowledgement (CRA1) has not been received within a predetermined time (step S34: No), the proxy control unit 36D transmits a connection request not acknowledgement (CRNA) to the machine 2 (step S42), and terminates the processing illustrated in FIG. 15. Although differing in message type, connection request not acknowledgement (CRNA) is substantially the same as the settings information of the CRA2. When transmission of data to the server 4 is not complete (step S39: No), the proxy control unit 36D proceeds to step S39, in order to determine whether or not transmission of data to the server 4 is complete.

In the connection establishing process illustrated in FIG. 15, the mobile router 3 establishes a connection between the machine 2 and the server 4, and transfers the data from the machine 2 to the server 4. As a result, the mobile router 3 is able to transfer the data from the machine 2 to the server 4 via heterogeneous communication networks.

When the mobile router 3 detects a link down with the machine 2 during communication between the machine 2 and the server 4, the mobile router 3 operates on behalf of the machine 2 and notifies the server 4 of the connection status (proxy) of the machine 2. As a result, the server 4 is able to recognize the connection status of the machine 2, thereby avoiding redundant transmission of message commands to the machine 2 with which the link is down and which is in a proxy state.

Figure 16:
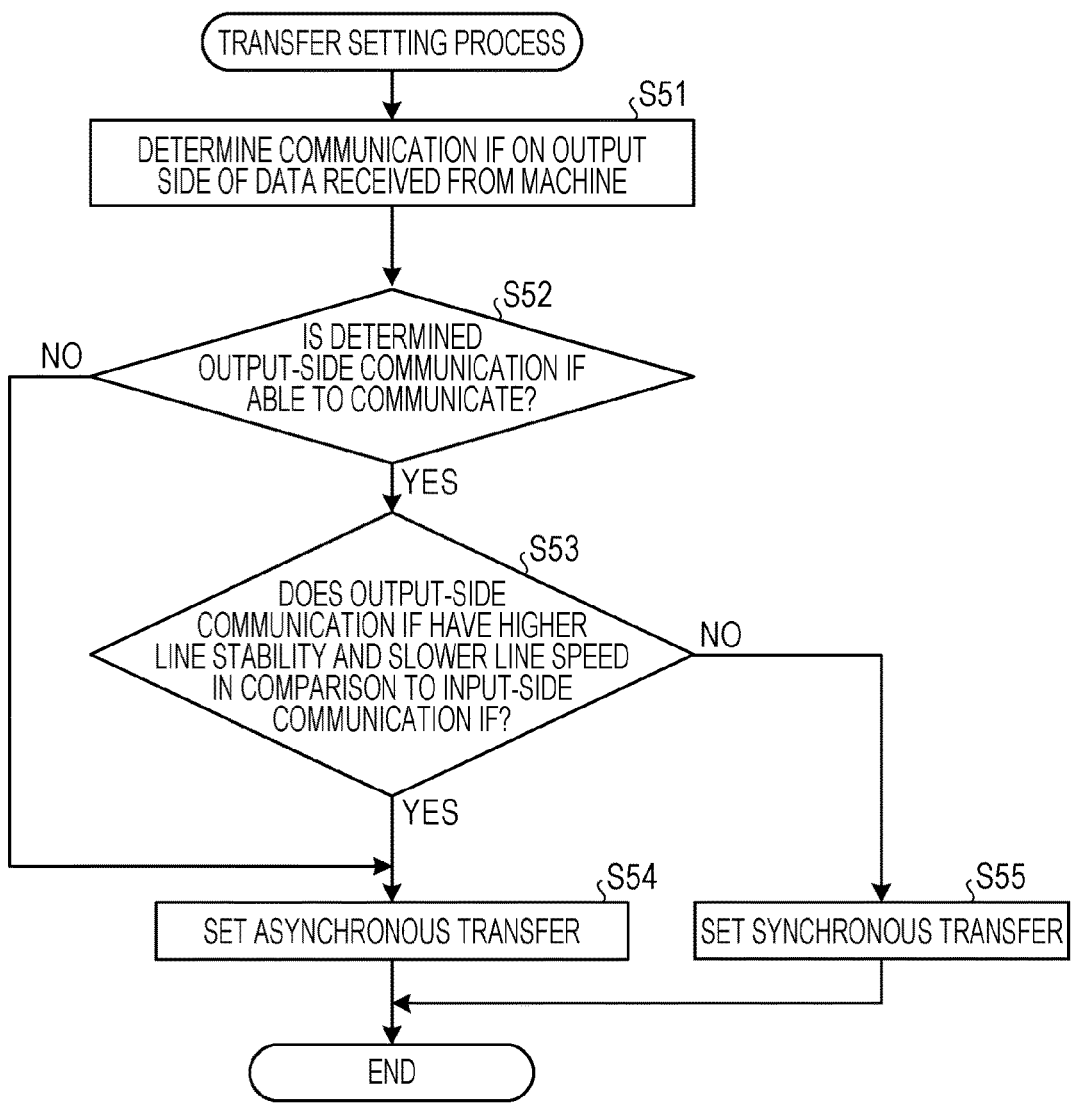
FIG. 16 is a diagram illustrating an example of an operational flowchart for transfer setting process by a mobile router, according to a first embodiment.

FIG. 16 is a diagram illustrating an example of an operational flowchart for transfer setting process by a mobile router, according to a first embodiment. FIG. 16 illustrates an example of the processing of the CPU 36 of the mobile router 3 with respect to a transfer setting process according to the first embodiment. The transfer setting process illustrated in FIG. 16 is a process that sets the transfer method when transferring data from the machine 2 to the server 4 on the basis of the line characteristics of a communication network coupled to the input-side communication IF and a communication network coupled to the output-side communication IF. In FIG. 16, the proxy control unit 36D in the CPU 36 of the mobile router 3 determines a communication IF on the output side of the data received from the machine 2 (step S51). In the case of the first embodiment, a communication IF on the output-side is, for example, the NW1 IF 33B of the wireless network NW1.

The proxy control unit 36D determines whether or not the determined output-side communication IF is able to communicate (step S52). When the output-side communication IF is able to communicate (step S52: Yes), the proxy control unit 36D determines whether or not a predetermined condition is satisfied where the predetermined condition indicates that a communication network coupled to the output-side communication IF has a high line stability and a slow line speed in comparison to a communication network coupled to the input-side communication IF (step S53). The proxy control unit 36D retrieves the line stability and the line speed in the IF table 34B by using the identification information of the NW1 IF 33B that is the output-side communication IF. In the first embodiment, the short-range wireless network NW0 as a communication network coupled to the input-side communication IF has a line stability of "1" and a line speed of 20 Mbps, and the wireless network NW1 as a communication network coupled to the output-side communication IF has a line stability of "2" and a line speed of 300 kbps. Therefore, the proxy control unit 36D determines that the predetermined condition is satisfied.

When the predetermined condition is satisfied (step S53: Yes), the proxy control unit 36D sets asynchronous transfer (step S54), and terminates the processing illustrated in FIG. 16. Asynchronous transfer refers to temporarily storing data from the machine 2 into the message buffer 34A and then transferring the temporarily stored data to the server 4. That is, in the first embodiment, data is transferred asynchronously between the short-range wireless network NW0 coupled to the input-side communication IF and the wireless network NW1 coupled to the output-side communication IF.

When the predetermined condition is not satisfied (step S53: No), the proxy control unit 36D sets synchronous transfer (step S55), and terminates the processing illustrated in FIG. 16. Examples of cases where the predetermined condition is not satisfied include when the radio quality of the wireless network NW1 of the NW1 IF 33B is poor and communication is frequently cut off, when passing through an area that is partially not covered by the wireless network NW1, and when the line speed of the wireless network NW1 is very high. When a stable communication network is not obtained, even if the mobile router 3 temporarily stores data, it is uncertain whether or not the mobile router 3 will be able to transfer the stored data later. When the line speed of the wireless network NW1 is high, there is no possibility of the output-side communication IF becoming a factor that limits transfer speed, and hence adopting synchronous transfer leads to improved transfer efficiency, rather than temporarily storing data. Synchronous transfer refers to transferring data received from the machine 2 to the server 4, without temporarily storing the received data in the message buffer 34A. That is, synchronous transfer refers to transferring data synchronously between the input-side communication network and the output-side communication network. For a communication network of the output-side IF that does not satisfy the predetermined condition, even if data from the machine 2 is buffered in the mobile router 3, there is no guarantee that the data will be successfully transferred later. Accordingly, transferring the data immediately when end-to-end transfer is possible leads to improved transfer efficiency, rather than transferring the data asynchronously.

When the determined output-side communication IF is not able to communicate (step S52: No), the proxy control unit 36D proceeds to step S54 in order to set asynchronous transfer.

In the transfer setting process in FIG. 16, the output-side communication IF is determined, and when the predetermined condition that the output-side communication network has a high line stability and a slow line speed in comparison to the input-side communication network is satisfied, asynchronous transfer between the machine 2 and the server 4 by the mobile router 3 is set. As a result, the mobile router 3 is able to efficiently transfer data asynchronously between the short-range wireless network NW0 coupled to the input-side communication IF and the wireless network NW1 coupled to the output-side communication IF.

In the transfer setting process, when the predetermined condition that the output-side communication network has a high line stability and a slow line speed in comparison to the input-side communication network is not satisfied, synchronous transfer between the machine 2 and the server 4 by the mobile router 3 is set. As a result, the mobile router 3 is able to efficiently transfer data synchronously between the short-range wireless network NW0 coupled to the input-side communication IF and the wireless network NW1 coupled to the output-side communication IF.

Figure 17:
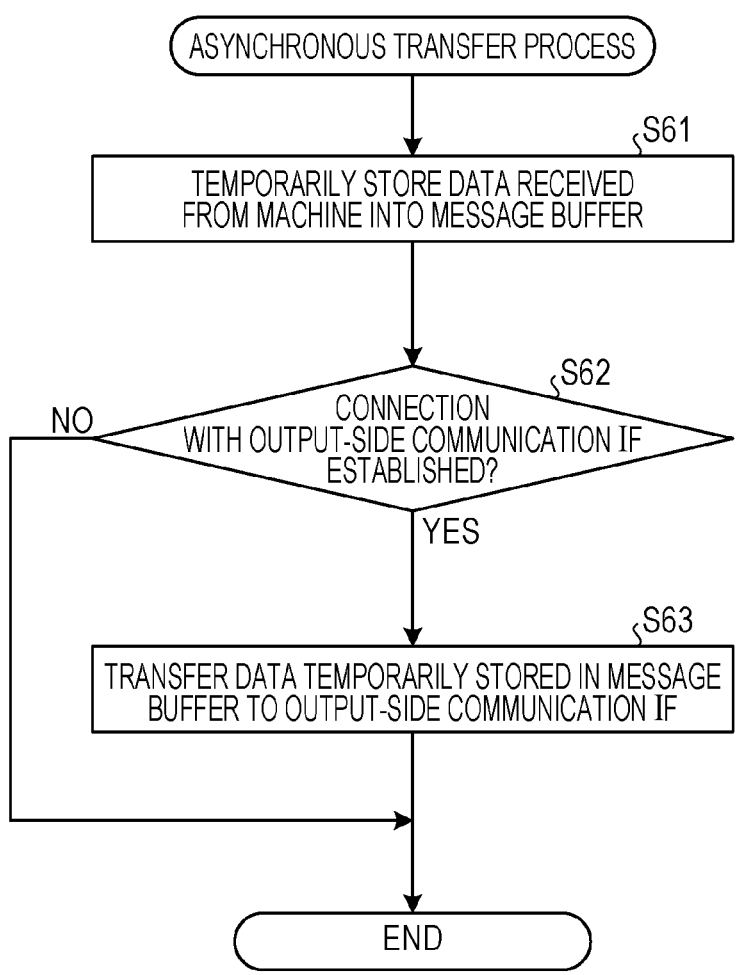
FIG. 17 is a diagram illustrating an example of an operational flowchart for an asynchronous transfer process by a mobile router, according to a first embodiment.

FIG. 17 is a diagram illustrating an example of an operational flowchart for an asynchronous transfer process by a mobile router, according to a first embodiment. FIG. 17 illustrates an example of the processing of the CPU 36 of the mobile router 3 with respect to an asynchronous transfer process according to the first embodiment. The asynchronous transfer process illustrated in FIG. 17 is a process that temporarily stores data received from the machine 2, and then sequentially transfers the temporarily stored data to the server 4. In FIG. 17, the proxy control unit 36D in the CPU 36 of the mobile router 3 temporarily stores data received from the machine 2 into the message buffer 34A (step S61), and determines whether or not a connection with the output-side communication IF has been established (step S62). In this case, the output-side communication IF is the NW1 IF 33B coupled to the wireless network NW1.

When a connection with the output-side communication IF has been established (step S62: Yes), the proxy control unit 36D transfers the data temporarily stored in the message buffer 34A to the output-side communication IF (step S63), and terminates the processing illustrated in FIG. 17. As a result, the mobile router 3 transfers the data from the machine 2 temporarily stored in the message buffer 34A, to the server 4 via the wireless network NW1.

When a connection with the output-side communication IF has not been established (step S62: No), the proxy control unit 36D terminates the processing illustrated in FIG. 17.

The mobile router 3 in the asynchronous transfer process illustrated in FIG. 17 temporarily stores data from the machine 2 into the message buffer 34A, and then transfers the temporarily stored data to the server 4. As a result, the mobile router 3 is able to efficiently transfer data asynchronously between the short-range wireless network NW0 that is a communication network on the input-side on the communication IF and the wireless network NW1 that is a communication network coupled to the output-side communication IF.

The mobile router 3 according to the first embodiment temporarily stores data from the machine 2 received via the input-side communication IF into the message buffer 34A, when the condition that the communication network on the output-side communication IF side has a high line stability and a slow line speed in comparison to the communication network coupled to the input-side communication IF is satisfied. Further, the mobile router 3 transfers the temporarily stored data to the server 4 via the output-side communication IF. As a result, the mobile router 3 is able to efficiently transfer information from the machine 2 to the server 4 asynchronously between heterogeneous communication networks.

The mobile router 3 does not store data from the machine 2 received via the input-side IF into the message buffer 34A, when the predetermined condition that the communication network on the output-side communication IF side has a high line stability and a slow line speed in comparison to the communication network on the input-side communication IF side is not satisfied. In the case, the mobile router 3 is able to efficiently transfer the data to the server 4 via the output-side communication IF.

In the first embodiment, when the vehicle in which the mobile router 3 is mounted makes rounds among the plurality of machines 2, and collects data on each of the machines 2, even in a case where the communication time between the mobile router 3 and the machine 2 is short, it is possible to receive a large amount of data from the machine 2 by making use of the short-range wireless network NW0 that is high speed. Then, the mobile router 3 temporarily stores the data received from the machine 2. Further, even after the connection with the machine 2 ends as the mobile router 3 moves, the mobile router 3 is able to transfer the temporarily stored data to the server 4 by using the wireless network NW1.

In the first embodiment, it is possible to build an M2M communication infrastructure that minimizes communication cost by reducing the number of mobile routers 3 used for collecting data, that is, the number of lines coupled to the wireless networks NW1.

The mobile router 3 according to the first embodiment operates on behalf of the machine 2 in sending a connection request from the machine 2 to the server 4. As a result, for the machine 2, it is possible to guarantee that data will reach the server 4 while employing store-carry-forward communication. Further, it is possible for both the machine 2 and the server 4 to efficiently transfer data in a manner suited for individual communication networks, without making the machine 2 and the server 4 aware of the mobile router 3 that dynamically changes.

In the first embodiment, in a case where communication is performed over heterogeneous communication networks, it is possible to make the most of the transfer efficiency of each communication network, without the transfer speed being limited by the communication network having the slowest line speed which constitutes the end-to-end connection.

In the first embodiment, connection and data transfer control are separated from each other, and the connection itself is handled by the mobile router 3 operating as a proxy as if an end-to-end connection is established, and the actual data transfer is performed asynchronously in accordance with the line characteristics of communication networks. As a result, it is possible to control data transfer in a manner that makes the most of the line characteristics of heterogeneous communication networks.

In the first embodiment, use of the storage 34 in the transfer control enables long-term buffering of data, and allows speed adjustment between heterogeneous communication networks by referencing the characteristics of lines used for transfer.

In the first embodiment, even in a case where the mobile router 3 that moves performs asynchronous transfer, the intercommunication between the machine 2 and the server 4 is maintained, and it is possible for the machine 2 and the server 4 to communicate with each other solely on the basis of identification information.

When the mobile router 3 detects a link down with the machine 2 during communication between the machine 2 and the server 4, the mobile router 3 operates on behalf of the machine 2 and notifies the server 4 of the connection status (proxy) of the machine 2. As a result, the server 4 is able to recognize the connection status of the machine 2, thereby avoiding redundant transmission of message commands to the machine 2 with which the link is down and which is in a proxy state.

The M2M information collecting system 1 according to the first embodiment mentioned above is configured so that the mobile router 3 transfers data received from the machine 2 to the server 4 via the wireless network NW1. However, the mobile router 3 may transfer received data to the server 4 via a communication apparatus connected to not only the wireless network NW1 but also a communication network that is superior in line stability and line speed to the wireless network NW1, for example, the corporate network NW3. An embodiment in this case will be described below as a second embodiment.

Second Embodiment

Figure 18:
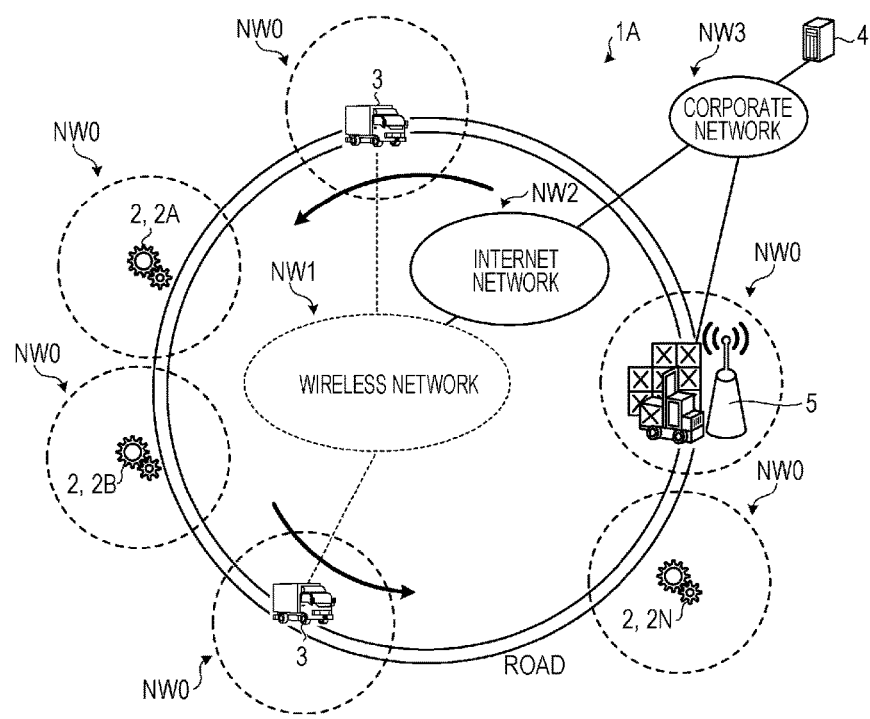
FIG. 18 is a diagram illustrating an example of an M2M information collecting system, according to a second embodiment.

FIG. 18 is a diagram illustrating an example of an M2M information collecting system, according to a second embodiment. The components that are the same as those of the M2M information collecting system 1 according to the first embodiment are denoted by the same symbols to omit description of overlapping components and operations.

In an M2M information collecting system 1A illustrated in FIG. 18, the gateway 5 connected to the corporate network NW3 is placed within the area of one of a plurality of short-range wireless networks NW0. The vehicle equipped with the mobile router 3 having the message buffer 34A in which the data from the machine 2 is temporarily stored enters the area of the short-range wireless network NW0 in which the gateway 5 is placed. Then, after establishing a connection with the gateway 5 within the short-range wireless network NW0, the mobile router 3 transfers the temporarily stored data from the machine 2, to the server 4 via the corporate network NW3 connected to the gateway 5.

When the CPU 36 in the mobile router 3 detects communication with a new communication apparatus, the CPU 36 stores, in the history table 34C, as history information, information on a communication network connected to the new communication apparatus and the line stability and line speed of the communication network. The history table 34C stores, as history information, the IF identification of the corporate network NW3, the terminal identification of the gateway 5 connected to the corporate network NW3, and the line stability and line speed of the corporate network NW3. For example, the line stability of the corporate network NW3 is "3", and the line speed of the corporate network NW3 is "11 Gbps".

Then, while setting asynchronous transfer, the CPU 36 references the history table 34C, and searches for a communication apparatus connected to a communication network that is able to communicate with the server 4 and is superior in line stability and line speed to a communication network coupled to the output-side communication IF on which an asynchronous setting process is to be performed, for example, the wireless network NW1. For example, the CPU 36 searches for the gateway 5 connected to the corporate network NW3 as a communication apparatus connected to a communication network that is superior in line stability and line speed to the wireless network NW1. Then, when the CPU 36 has found the gateway 5 connected to the corporate network NW3, the CPU 36 computes a life time on the basis of the valid time of the data being temporarily stored and the predicted time for the data to arrive at the server 4. The life time is a maximum time limit within which data is supposed to arrive at the server 4 via the wireless network NW1. Further, until the life time elapses, the proxy control unit 36D in the CPU 36 stops transfer of the temporarily stored data to the server 4 via the wireless network NW1, and gives priority to transfer of data to the server 4 via the corporate network NW3 through the gateway 5. When a connection with the gateway 5 has not been successfully established within the life time, the proxy control unit 36D transfers data to the server 4 via the wireless network NW1.

Figure 19:
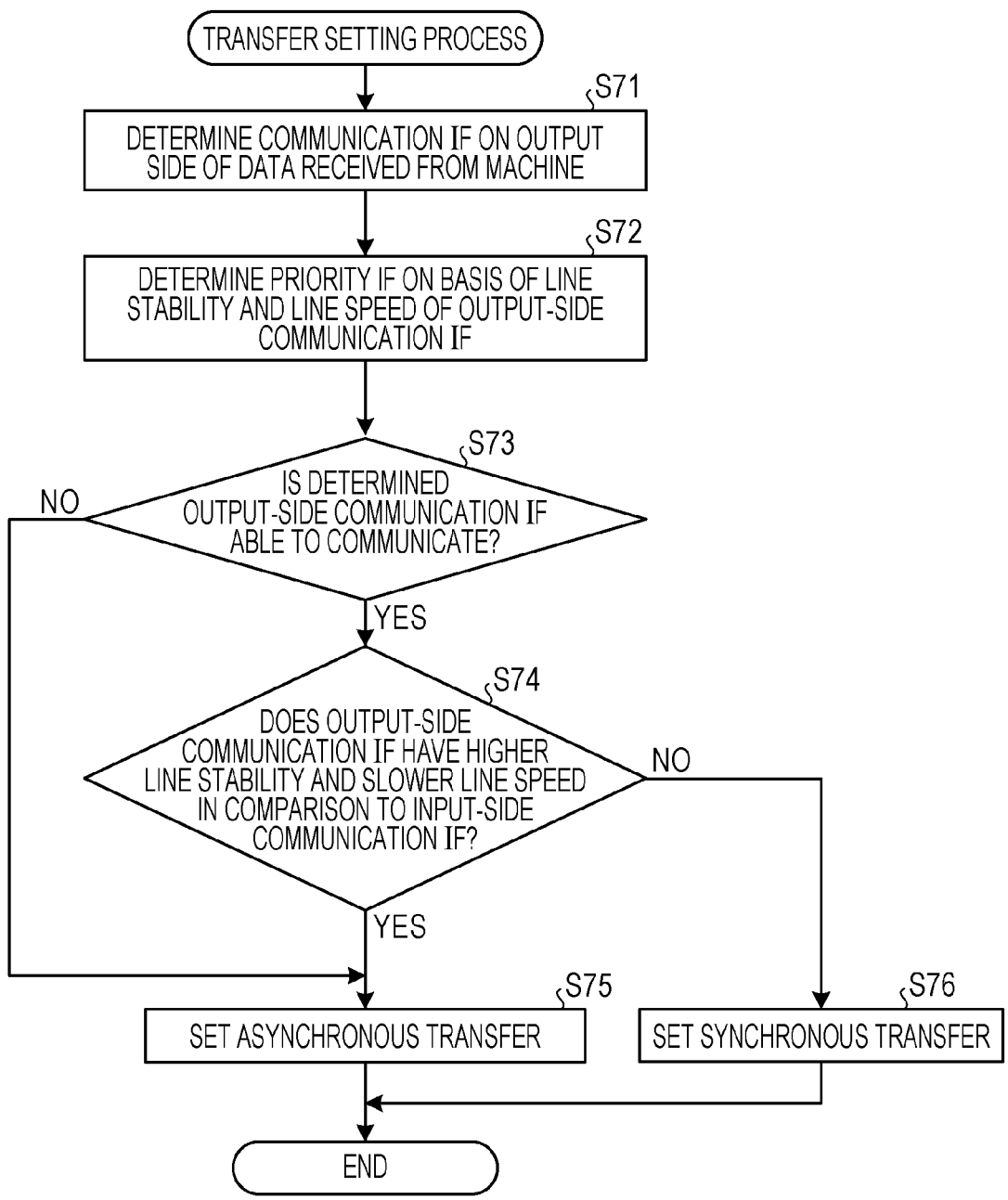
FIG. 19 is a diagram illustrating an example of an operational flowchart for transfer setting process by a mobile router, according to a second embodiment.

FIG. 19 is a diagram illustrating an example of an operational flowchart for transfer setting process by a mobile router, according to a second embodiment. FIG. 19 illustrates an example of the processing of the CPU 36 of the mobile router 3 with respect to a transfer setting process according to the second embodiment. The transfer setting process illustrated in FIG. 19 is a process that determines a normal output-side communication IF and a priority IF, and sets the transfer method for the normal output-side communication IF.

In FIG. 19, the proxy control unit 36D in the CPU 36 of the mobile router 3 determines a normal communication IF on the output side of the data received from the machine 2 (step S71). In this case, the normal output-side communication IF is the wireless network NW1.

The proxy control unit 36D references the history table 34C, and determines a priority IF on the basis of the line stability and line speed of the normal output-side communication IF (step S72). At this time, the proxy control unit 36D references the history table 34C, and determines, for example, the gateway 5 connected to the corporate network NW3, as a priority IF whose line stability and also line speed are higher than those of the wireless network NW1 that is the normal output-side communication IF.

The proxy control unit 36D determines whether or not the determined normal output-side communication IF is able to communicate (step S73). When the normal output-side communication IF is able to communicate (step S73: Yes), the proxy control unit 36D determines whether or not a predetermined condition is satisfied (step S74), where the predetermined condition is that the normal output-side communication IF has a high line stability and a slow line speed in comparison to the input-side communication IF.

When the predetermined condition is satisfied (step S74: Yes), the proxy control unit 36D sets asynchronous transfer (step S75), and terminates the processing illustrated in FIG. 19.

When the predetermined condition is not satisfied (step S74: No), the proxy control unit 36D sets synchronous transfer (step S76), and terminates the processing illustrated in FIG. 19. Meanwhile, when the determined normal output-side communication IF is not able to communicate (step S73: No), the proxy control unit 36D proceeds to step S75, in order to set asynchronous transfer.

In the transfer setting process illustrated in FIG. 19, when there exists, in the history table 34C, information on a communication apparatus connected to a communication network whose line stability and line speed are higher than those of a communication network coupled to the normal output-side communication IF, the communication apparatus is set as a priority IF. As a result, the transfer efficiency with which data from the machine 2 is transferred to the server 4 may be improved.

Figure 20:
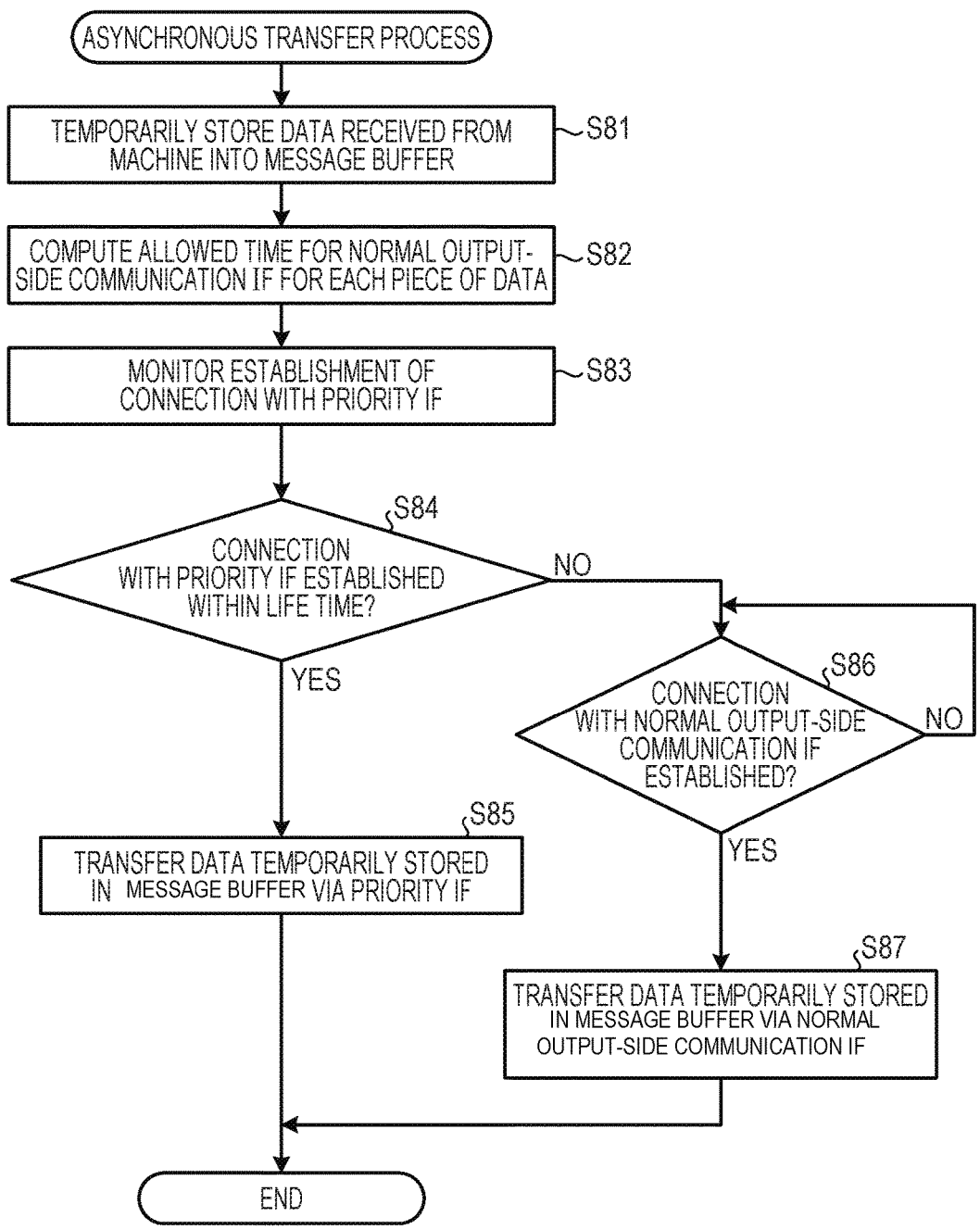
FIG. 20 is a diagram illustrating an example of an operational flowchart for asynchronous transfer process by a mobile router, according to a second embodiment.

FIG. 20 is a diagram illustrating an example of an operational flowchart for an asynchronous transfer process by a mobile router, according to a second embodiment. FIG. 20 illustrates an example of the processing of the CPU 36 of the mobile router 3 with respect to an asynchronous transfer process according to the second embodiment. The asynchronous transfer process illustrated in FIG. 20 is a process that temporarily stores data received from the machine 2, and then transfers the temporarily stored data to the server 4 via a priority IF or a normal output-side communication IF. In FIG. 20, the proxy control unit 36D in the CPU 36 of the mobile router 3 temporarily stores data received from the machine 2 into the message buffer 34A (step S81). Further, the proxy control unit 36D computes a life time within which the temporarily stored data is supposed to arrive at the server 4 via a communication network coupled to the normal output-side communication IF, for example, the wireless network NW1 (step S82). Then, the proxy control unit 36D stores the life time into the message buffer 34A for each piece of data. Assuming that, for example, the valid time of data is one hour, the data size is 10 MB, the line speed of the wireless network NW1 is 300 kbps, and the predicted arrival time for the data to arrive at the server 4 is five minutes, the life time becomes 55 minutes.

The proxy control unit 36D monitors establishment of a connection with the priority IF (step S83). The proxy control unit 36D monitors establishment of a connection on the basis of whether or not the proxy control unit 36D has received a response to a connection request acknowledgement (CRA) from the gateway 5 that is the priority IF. The proxy control unit 36D determines whether or not a connection with the priority IF has been established within the life time (step S84). In the case of FIG. 18, the priority IF is the gateway 5 connected to the corporate network NW3 that is connected to the server 4. Moreover, whether the life time is up is determined by using the scheduler 36A.

When a connection with the priority IF has been established within the life time (step S84: Yes), the proxy control unit 36D transfers the data temporarily stored in the message buffer 34A to the server 4 via the priority IF (step S85). Then, the proxy control unit 36D terminates the processing illustrated in FIG. 20. As a result, the mobile router 3 transfers the data temporarily stored in the message buffer 34A to the server 4 via the corporate network NW3 through the gateway 5.

When a connection with the priority IF has not been established within the life time (step S84: No), the proxy control unit 36D determines whether or not a connection with the normal output-side communication IF has been established (step S86). In this case, the normal output-side communication IF is the NW1 IF 33B of the wireless network NW1. When a connection with the normal output-side communication IF has been established (step S86: Yes), the proxy control unit 36D transfers the data temporarily stored in the message buffer 34A to the server 4 via the normal output-side communication IF (step S87), and terminates the processing illustrated as FIG. 20. As a result, the mobile router 3 transfers the data temporarily stored in the message buffer 34A to the sever 4 via the wireless network NW1.

When a connection with the normal output-side communication IF has not been established (step S86: No), the proxy control unit 36D proceeds to step S86, in order to determine whether or not a connection with the normal output-side communication IF has been established.

The mobile router 3 in the asynchronous transfer process illustrated in FIG. 20 transfers data temporarily stored in the message buffer 34A to the server 4 via the priority IF when a connection with the priority IF has been established within the life time. As a result, the mobile router 3 is able to efficiently transfer data from the machine 2 to the server 4 via the corporate network NW3.

When a connection with the priority IF has not been established within the life time, the mobile router 3 establishes a connection with the normal output-side communication IF, and transfers the data temporarily stored in the message buffer 34A to the server 4 via the normal output-side communication IF. As a result, the mobile router 3 is able to efficiently transfer data from the machine 2 to the server 4 via the wireless network NW1.

The mobile router 3 according to the second embodiment references the history table 34C, and selects, as a priority IF, a communication apparatus whose output-side communication IF is coupled to a communication network having a higher line stability and a faster line speed than those of a communication network coupled to the normal output-side communication IF. The mobile router 3 preferentially transfers data from the machine 2 temporarily stored in the message buffer 34A to the server 4 via the priority IF. As a result, the efficiency of data transfer within the M2M information collecting system 1A may be optimized. Moreover, it is possible to select which data is to be transferred via the wireless network NW1, on the basis of the urgency of communication requested by an application, thereby enabling a further reduction in communication cost.

There is a possibility that the mobile router 3 may encounter a communication apparatus having a line with higher line speed than the communication IF owned by the mobile router 3 (for example, a wireless hotspot that is connected by a wire). Then, the mobile router 3 may record information on the communication IF owned by this communication apparatus as history information, in a history of past communication with communication apparatuses.

While the above-mentioned embodiments are directed to the M2M information collecting system 1 that transfers data from the machine 2 to the server 4, the embodiments are also applicable to a relay system that transfers data from a terminal device to an opposite-side terminal device between heterogeneous communication networks, without limitation to the machine 2 or the server 4.

The components of the individual units depicted in the drawings may not have to be physically configured as depicted in the drawings. That is, the specific form of dispersion/integration of the individual units is not limited to the form depicted in the drawings, and the whole or part of the individual units may be configured so as to be functionally or physically dispersed/integrated in arbitrary units in accordance with various loads, usage conditions, and so on.

The whole or an arbitrary part of various process functions executed in individual devices may be executed on a central processing unit (CPU) (or a microcomputer such as a micro processing unit (MPU) or a micro controller unit (MCU)). Moreover, it is needless to mention that the whole or an arbitrary part of the various process functions may be executed using a program that is analyzed and executed by a CPU (or a microcomputer such as a MPU or a MCU), or using a piece of hardware based on a wired logic.

The various processes described with reference to the embodiments above may be implemented by executing a program prepared in advance by a communication device. Accordingly, hereinafter, an example of a communication device that executes a program having the same function as the above-mentioned embodiments will be described.

Figure 21:
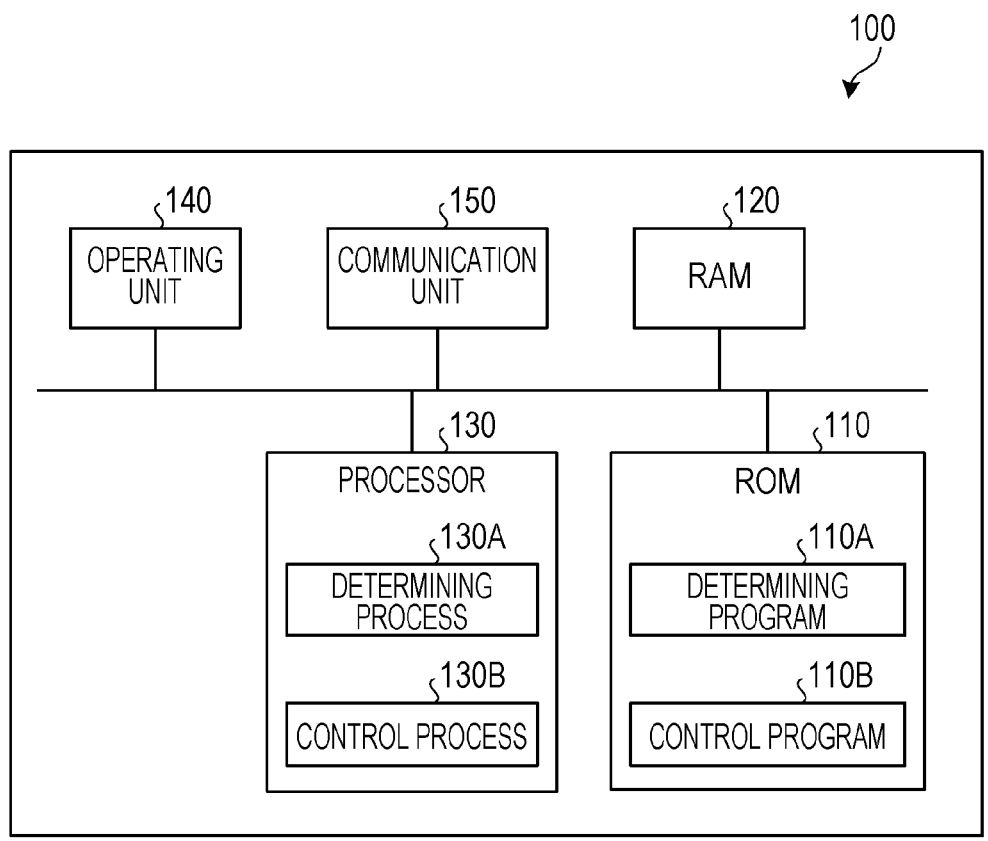
FIG. 21 is a diagram illustrating a configuration example of a communication device that executes a transfer program, according to an embodiment.
Figure 22:
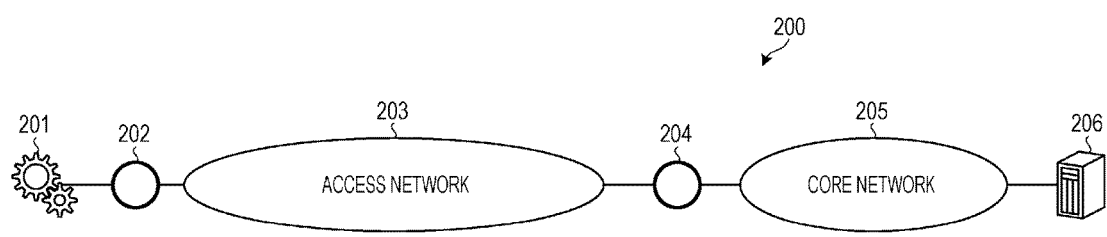
FIG. 22 is an explanatory diagram illustrating an example of an M2M information collecting system.

FIG. 21 is a diagram illustrating a configuration example of a communication device that executes a transfer program, according to an embodiment.

In FIG. 21, a communication device 100 that executes a transfer program includes a ROM 110, a RAM 120, a processor 130, an operating unit 140, and a communication unit 150. A transfer program that exhibits the same function as the above-mentioned embodiments is stored in the ROM 110 in advance. The transfer program may be recorded not in the ROM 110 but on a recording medium that may be read by a drive (not illustrated). The recording medium may be, for example, a potable recording medium such as a CR-ROM, a DVD disc, a USB memory, or an SD card, or a semiconductor memory such as a flash memory. The transfer program includes a determining program 110A and a control program 110B as illustrated in FIG. 21. The programs 110A and 110B may be integrated or dispersed as appropriate.

The processor 130 reads the programs 110A and 110B from the ROM 110, and executes each of these read programs. Then, the processor 130 causes the programs 110A and 110B to function as a determining process 130A and a control process 130B, respectively. The communication unit 150 performs an IF function that enables communication with a terminal device via a first communication network, and enables communication with an opposite-side terminal device via a second communication network.

The processor 130 of the communication device 100 determines whether or not a predetermined condition is satisfied. The predetermined condition is that the line stability of the second communication network is higher than the line stability of the first communication network, and that the line speed of the second communication network is slower than the line speed of the first communication network. Further, when the predetermined condition is satisfied, the processor 130 temporarily stores data from the terminal device received via the first communication network into the RAM 120, and then transfers the temporarily stored data to the opposite-side terminal device via the second communication network. As a result, the transfer efficiency when transferring data from the terminal device to the opposite-side terminal device via heterogeneous communication networks is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having stored therein a program for causing at least one hardware processor to implement functions of a relay device that communicates with a plurality of communication networks to execute a procedure, the procedure comprising:
    detecting a first communication link with a first device located within a first communication network among the plurality of communication networks;
    receiving at least one accumulated message among accumulated messages from the first device using the first communication link through the first communication network;
    buffering the at least one accumulated message into at least one memory;
    identifying a second device as a server destination of the at least one accumulated message, the second device communicating with the relay device using a second communication link through a second communication network from among the plurality of communication networks;
    acquiring, from the at least one memory that stores information indicating correspondences of communication links of the communication networks to degrees of communication connection establishment indicative of communication link stability to the communication networks, and communication speeds of the communication links,
        a first degree of communication connection establishment and a first communication link speed corresponding to the first communication network, and
        a second degree of communication connection establishment and a second communication link speed corresponding to the second communication network;
    determining whether a condition is satisfied that the acquired second degree of communication connection establishment corresponding to the second communication network for the server destination is higher than the first degree of communication connection establishment corresponding to the first communication network for the first device, and the second communication link speed corresponding to the second communication network for the server destination is lower than the first communication link speed corresponding to the first communication network for the first device;
    in response to the condition satisfied and receiving at least one remaining accumulated message of the accumulated messages other than the buffered at least one accumulated message from the first device using the first communication link through the first communication network,
        buffering the at least one remaining accumulated message into the at least one memory, and
        after the receiving of the at least one remaining accumulated message is completed, transmitting an acknowledgment of the receipt to the first device to indicate transfer completion by the relay device of the accumulated messages of the first device; and
    transferring, from the at least one memory, the buffered at least one accumulated message and the at least one remaining accumulated message to the second device as the server destination using the second communication link through the second communication network.

2. The non-transitory computer readable recording medium of claim 1, wherein the procedure further comprises:
    in response to the condition not satisfied, transferring the data corresponding to the at least one message received from the first device, to the second device through the second communication link to the second communication network before the transfer completion of the accumulated messages by the first device.

3. The non-transitory computer readable recording medium of claim 1, wherein the at least one memory further stores information indicating correspondences of communication apparatuses to degrees of communication connection establishments indicative of stabilities of third communication links to a third communication network for the server destination from among the communication networks, and communication speeds of the third communication links to the third communication network, and the second communication link includes a third communication link among the third communication links through the third communication network for the server destination, and
    the transferring includes selecting, from the information indicating the correspondences of the communication apparatuses, a priority communication apparatus, through which to perform the transferring the buffered at least one message to the second device, for which a third degree of communication connection establishment of the third communication network is higher than the second degree of communication establishment of the second communication network and a third communication link speed of the third communication network is faster than the second communication link speed of the second communication network.

4. The non-transitory computer readable recording medium of claim 3, wherein the transferring includes:
in response to a detection of communication with the priority communication apparatus within a life time in which the data from the first device is scheduled to arrive at the second device through the second communication network and the third communication network, preferentially selecting the priority communication apparatus through which to perform the transferring the buffered at least one accumulated message and the at least one remaining accumulated message to the second device.

5. The non-transitory computer readable recording medium of claim 3, wherein the procedure further comprises:
in response to a detection of communication with a new communication apparatus, storing, in the information indicating correspondences of communication apparatuses, information of the new communication apparatus and a fourth degree of communication connection establishment and a fourth communication link speed of a fourth communication network through which the new communication apparatus is able to communicate with the second terminal device.

6. The non-transitory computer readable recording medium of claim 1, wherein the procedure further comprises:
in response to detection of termination of communication with the first device through the first communication network during a communication between the first device communicating using the first communication network and the second device communicating using the second communication network, notifying the second device of a status of connection with the first device, through the second communication network.

7. A relay device configured to communicate with devices via a plurality of communication networks, the relay device comprising:
at least one memory to store data and instructions; and
at least one hardware processor to execute the instructions to cause the relay device to:
detect a first communication link with a first device among the devices located within a first communication network among the plurality of communication networks;
receive at least one accumulated message among accumulated messages from the first device using the first communication link through the first communication network;
buffer the at least one accumulated message into the at least one memory;
identify a second device among the devices as a server destination of the at least one accumulated message, the second device communicating with the relay device using a second communication link through a second communication network from among the plurality of communication networks;
acquire, from the at least one memory that stores information indicating correspondences of communication links of the communication networks to degrees of communication connection establishment indicative of communication link stability to the communication networks, and communication speeds of the communication links,
a first degree of communication connection establishment and a first communication link speed corresponding to the first communication network, and
a second degree of communication connection establishment and a second communication link speed corresponding to the second communication network;
determine whether a condition is satisfied that the acquired second degree of communication connection establishment corresponding to the second communication network for the server destination is higher than the first degree of communication connection establishment corresponding to the first communication network for the first device, and the second communication link speed corresponding to the second communication network for the server destination is lower than the first communication link speed corresponding to the first communication network for the first device;
in response to the condition satisfied and receipt of at least one remaining accumulated message of the accumulated messages other than the buffered at least one accumulated message from the first device using the first communication link through the first communication network,
buffer the at least one remaining accumulated message into the at least one memory, and
after the receipt of the at least one remaining accumulated message is completed, transmit an acknowledgment of the receipt to the first device to indicate transfer completion by the relay device of the accumulated messages of the first device; and
transfer, from the at least one memory, the buffered at least one accumulated message and the at least one remaining accumulated message to the second device as the server destination using the second communication link through the second communication network.

8. The relay device of claim 7, wherein
the relay device is mounted in a movable body that moves within an area of the first communication network or the second communication network.

9. A method for a relay device to communicate with a plurality of devices via a plurality of communication networks, the method comprising:
by at least one hardware processor that executes instructions stored in at least one memory to,
detect a first communication link with a first device among the devices located within a first communication network among the plurality of communication networks;
receive at least one accumulated message among accumulated messages from the first device using the first communication link through the first communication network;
buffer the at least one accumulated message into the at least one memory;
identify a second device among the devices as a server destination of the at least one accumulated message, the second device communicating with the relay device using a second communication link through a second communication network from among the plurality of communication networks;
acquire, from the at least one memory that stores information indicating correspondences of communication links of the communication networks to degrees of communication connection establishment indicative of communication link stability to the communication networks, and communication speeds of the communication links,
- a first degree of communication connection establishment and a first communication link speed corresponding to the first communication network, and
- a second degree of communication connection establishment and a second communication link speed corresponding to the second communication network;

determine whether a condition is satisfied that the acquired second degree of communication connection establishment corresponding to the second communication network for the server destination is higher than the first degree of communication connection establishment corresponding to the first communication network for the first device, and the second communication link speed corresponding to the second communication network for the server destination is lower than the first communication link speed corresponding to the first communication network for the first device;

in response to the condition satisfied and receipt of at least one remaining accumulated message of the accumulated messages other than the buffered at least one accumulated message from the first device using the first communication link through the first communication network,
- buffer the at least one remaining accumulated message into the at least one memory, and
- after the receipt of the at least one remaining accumulated message is completed, transmit an acknowledgment of the receipt to the first device to indicate transfer completion by the relay device of the accumulated messages of the first device; and transfer, from the at least one memory, the buffered at least one accumulated message and the at least one remaining accumulated message to the second device as the server destination using the second communication link through the second communication network.

10. A system comprising:
a first device that communicates using a first communication network;
a second device that communicates using a second communication network; and
a relay device comprising:
at least one memory to store data and instructions; and
at least one hardware processor to execute the instructions to cause the relay device to:
detect a first communication link with the first device using the first communication network;
receive at least one accumulated message among accumulated messages from the first device using the first communication link through the first communication network;
buffer the at least one accumulated message into at least one memory;
identify a second device as a server destination of the at least one accumulated message, the second device communicating with the relay device using a second communication link using the second communication network;
acquire, from the at least one memory that stores information indicating correspondences of communication links of communication networks to degrees of communication connection establishment indicative of communication link stability to the communication networks, and communication speeds of the communication links,
- a first degree of communication connection establishment and a first communication link speed corresponding to the first communication network among the communication networks, and
- a second degree of communication connection establishment and a second communication link speed corresponding to the second communication network among the communication networks;

determine whether a condition is satisfied that the acquired second degree of communication connection establishment corresponding to the second communication network for the server destination is higher than the first degree of communication connection establishment corresponding to the first communication network for the first device, and the second communication link speed corresponding to the second communication network for the server destination is lower than the first communication link speed corresponding to the first communication network for the first device;

in response to the condition satisfied and receipt of at least one remaining accumulated message of the accumulated messages other than the buffered at least one accumulated message from the first device using the first communication link through the first communication network,
- buffer the at least one remaining accumulated message into the at least one memory, and
- after the receipt of the at least one remaining accumulated message is completed, transmit an acknowledgment of the receipt to the first device to indicate transfer completion by the relay device of the accumulated messages of the first device; and transfer, from the at least one memory, the buffered at least one accumulated message and the at least one remaining accumulated message to the second device as the server destination using the second communication link through the second communication network.

* * * * *